US012676811B1

(12) United States Patent
Rofougaran et al.

(10) Patent No.: US 12,676,811 B1
(45) Date of Patent: *Jul. 7, 2026

(54) COMMUNICATION SYSTEM AND METHOD OF WIRELESS COMMUNICATION IN HIERARCHICAL COMMUNICATION NETWORK

(71) Applicant: PELTBEAM INC., Sherman Oaks, CA (US)

(72) Inventors: Ahmadreza Rofougaran, Newport Beach, CA (US); Shervin Alireza Odabaee, Newport Coast, CA (US); Mehdi Hatamian, Mission Viejo, CA (US); Puya Rofougaran, Irvine, CA (US); Arman Rofougaran, Newport Coast, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/320,093

(22) Filed: Sep. 5, 2025

Related U.S. Application Data

(63) Continuation of application No. 19/091,944, filed on Mar. 27, 2025, now Pat. No. 12,452,160.

(51) Int. Cl.
H04L 45/02 (2022.01)
H04L 41/08 (2022.01)
(52) U.S. Cl.
CPC .............. *H04L 45/04* (2013.01); *H04L 41/08* (2013.01)

(58) Field of Classification Search
CPC ................................ H04L 45/04; H04L 41/08
See application file for complete search history.

(56) References Cited

U.S. PATENT DOCUMENTS 7,984,184 B2 * 7/2011 Woon .................... H04W 4/029
709/227
11,553,857 B1 * 1/2023 Filipovic ................. A61B 3/14
(Continued)

FOREIGN PATENT DOCUMENTS

IN         20140166014         8/2016

OTHER PUBLICATIONS

Non-Final Office Action for U.S. Appl. No. 19/091,944, dated Apr. 21, 2025.

(Continued)

*Primary Examiner* — Richard G Keehn
(74) *Attorney, Agent, or Firm* — CHIP LAW GROUP

(57) ABSTRACT

A communication system that includes a plurality of network nodes interconnected in a hierarchical communication network. Each network node of the plurality of network nodes is associated with a level of hierarchy of distinct levels of hierarchy in the hierarchical communication network. The plurality of network nodes includes a global master node that performs a continuous collection and analysis of network-wide telemetry information across the distinct levels of hierarchy to implement a dynamic reassignment of hierarchical roles of specific network nodes of the plurality of network nodes. The dynamic reassignment is based on at least one of: changing positions of the specific network nodes, connectivity quality of the specific network nodes, or operational characteristics of the specific network nodes.

17 Claims, 5 Drawing Sheets

(56)        References Cited

U.S. PATENT DOCUMENTS

| 12,141,675 | B1 * | 11/2024 | Duong | H04B 7/024 |
|---|---|---|---|---|
| 12,185,134 | B1 * | 12/2024 | Duong | H04W 24/02 |
| 12,279,312 | B2 * | 4/2025 | He | H04L 5/0053 |
| 2016/0050123 | A1 * | 2/2016 | Nishanov | H04L 67/10 |
| | | | | 709/223 |
| 2019/0364492 | A1 * | 11/2019 | Azizi | H04W 52/0264 |
| 2022/0109622 | A1 * | 4/2022 | Yeh | H04L 67/10 |
| 2022/0303785 | A1 * | 9/2022 | McSchooler | H04L 41/20 |
| 2023/0352838 | A1 * | 11/2023 | Svendsen | H04B 17/12 |
| 2024/0080363 | A1 * | 3/2024 | Wang | H04L 67/12 |
| 2024/0129779 | A1 * | 4/2024 | Au | H04W 24/10 |
| 2024/0306001 | A1 * | 9/2024 | Andrews | H04W 16/18 |
| 2024/0340825 | A1 * | 10/2024 | Wigard | H04W 56/0015 |
| 2024/0357533 | A1 * | 10/2024 | Jacobsen | H04W 56/0065 |
| 2024/0364412 | A1 * | 10/2024 | Van Phan | H04B 7/15507 |
| 2024/0373345 | A1 * | 11/2024 | Niemela | H04L 41/0895 |
| 2024/0380688 | A1 * | 11/2024 | Koskinen | H04L 45/02 |
| 2024/0414746 | A1 * | 12/2024 | Lee | G06N 20/20 |
| 2025/0068957 | A1 * | 2/2025 | Kim | G06N 10/40 |
| 2025/0071040 | A1 * | 2/2025 | Wang | G16Y 40/50 |

OTHER PUBLICATIONS

Notice of Allowance for U.S. Appl. No. 19/091,944, dated Jun. 24, 2025.

* cited by examiner

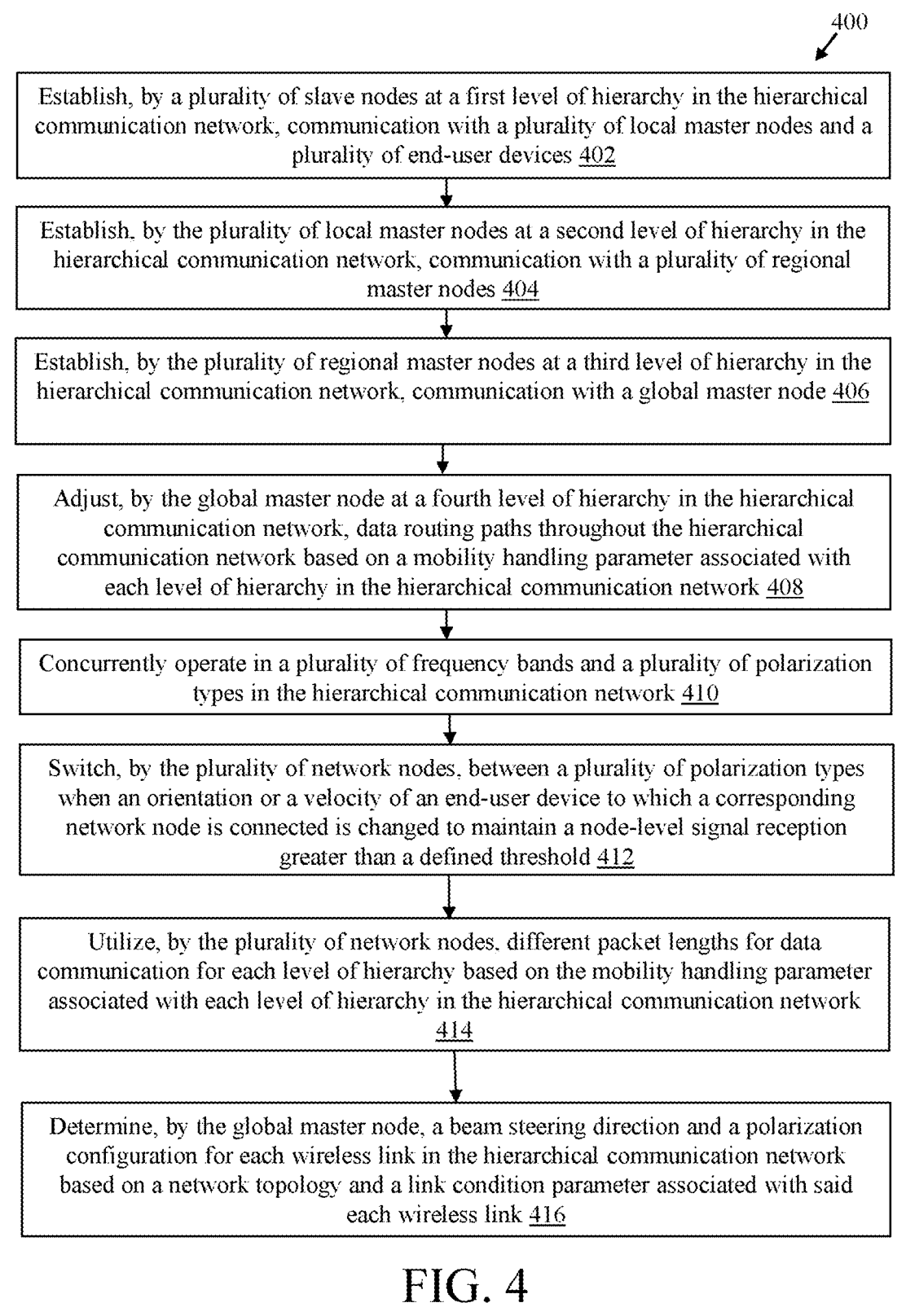

400

Establish, by a plurality of slave nodes at a first level of hierarchy in the hierarchical communication network, communication with a plurality of local master nodes and a plurality of end-user devices 402

Establish, by the plurality of local master nodes at a second level of hierarchy in the hierarchical communication network, communication with a plurality of regional master nodes 404

Establish, by the plurality of regional master nodes at a third level of hierarchy in the hierarchical communication network, communication with a global master node 406

Adjust, by the global master node at a fourth level of hierarchy in the hierarchical communication network, data routing paths throughout the hierarchical communication network based on a mobility handling parameter associated with each level of hierarchy in the hierarchical communication network 408

Concurrently operate in a plurality of frequency bands and a plurality of polarization types in the hierarchical communication network 410

Switch, by the plurality of network nodes, between a plurality of polarization types when an orientation or a velocity of an end-user device to which a corresponding network node is connected is changed to maintain a node-level signal reception greater than a defined threshold 412

Utilize, by the plurality of network nodes, different packet lengths for data communication for each level of hierarchy based on the mobility handling parameter associated with each level of hierarchy in the hierarchical communication network 414

Determine, by the global master node, a beam steering direction and a polarization configuration for each wireless link in the hierarchical communication network based on a network topology and a link condition parameter associated with said each wireless link 416

FIG. 4

COMMUNICATION SYSTEM AND METHOD OF WIRELESS COMMUNICATION IN HIERARCHICAL COMMUNICATION NETWORK

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 19/091,944, filed on Mar. 27, 2025.

The above referenced application is hereby incorporated herein by reference in its entirety.

FIELD OF TECHNOLOGY

Certain embodiments of the disclosure relate to a hierarchical communication system for wireless communication. More specifically, certain embodiments of the disclosure relate to a communication system and a method of wireless communication in a hierarchical communication network.

BACKGROUND

In today's increasingly connected world, traditional network architecture faces significant challenges in meeting the demands of modern applications and use cases. Conventional wireless networks, typically characterized by flat architecture or simple master-slave configurations, are struggling to address the complexities introduced by the exponential growth in connected devices and data traffic.

In an example, the mobility of network nodes (e.g., not only user equipment (UEs) but also other network nodes like drones etc.) may introduce challenges that traditional architectures were not designed to handle effectively. As devices move throughout the network, maintaining reliable connections becomes increasingly complex. Traditional networks struggle with the dynamic nature of mobile nodes, where devices frequently change their physical location and network attachment points. This constant movement creates significant challenges for maintaining service quality, managing handoffs between access points, and ensuring stable network performance.

Further, as the number of connected devices continues to multiply across various sectors, for example, from industrial automation to smart infrastructure, the limitations of traditional network setups become more apparent. These systems often face technical challenges including network congestion, limited scalability, and insufficient adaptability to dynamic operational requirements. Traditional network architectures were designed for simpler, more predictable environments with relatively static nodes and less demanding communication requirements. However, contemporary applications require networks capable of handling high-density node deployment with significant mobility while maintaining reliable communication in diverse and sometimes challenging environments. Current systems struggle with issues such as efficient resource allocation, network optimization, and the ability to dynamically adapt to changing scenarios. These challenges become particularly acute in applications requiring real-time data processing and decision-making capabilities across distributed networks with mobile nodes. Thus, in scenarios involving highly mobile nodes and dynamic network topologies, conventional communication systems and methods may be ineffective at least in terms of reliability and latency handling.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A communication system and a method of wireless communication in a hierarchical communication network, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF DRAWINGS

FIG. 4 is a diagram that illustrates a flowchart of a method of wireless communication in a hierarchical communication network, in accordance with an embodiment of the disclosure.

DETAILED DESCRIPTION OF THE DISCLOSURE

Certain embodiments of the disclosure may be found in communication systems and a method of wireless communication in a hierarchical communication network. The disclosed communication systems and method of wireless communication employ a hierarchical communication network structure with distinct hierarchical levels (e.g., slave nodes, local master nodes, regional master nodes, and a global master node). Such hierarchical communication network structure enables efficient management of wireless devices based on their mobility characteristics. In the disclosed communication system, by associating different mobility ranges with each hierarchical level, the communication system significantly improves handling of varying movement patterns, for example, from highly mobile devices at lower levels (e.g., slave nodes) to nearly static nodes (e.g., the global master node) at higher levels. This hierarchical mobility-based network structure leads to more efficient handoff processes and reduced network overhead compared to traditional network architecture.

Furthermore, the global master node's (a part of the disclosed communication system) ability to adjust routing paths based on mobility handling parameters associated with each hierarchical level results in: a) improved data routing that accounts for device movement patterns, b) efficient resource allocation across different mobility zones, c) reduced latency in handling mobile device transitions, d) enhanced network reliability through mobility-aware path selection, and c) improved scalability as the communication system can efficiently manage additional nodes while maintaining performance. The combination of hierarchical communication network structure and mobility-aware routing enables a highly adaptable, resilient, scalable, and efficient communication system that effectively handles varying mobility requirements while maintaining optimal network performance. In an example, hierarchical communication network structure and mobility-aware routing may be beneficial in scenarios involving multiple mobile devices operating at different scales of movement, providing seamless connectivity while efficiently managing network resources.

Figure 1A:
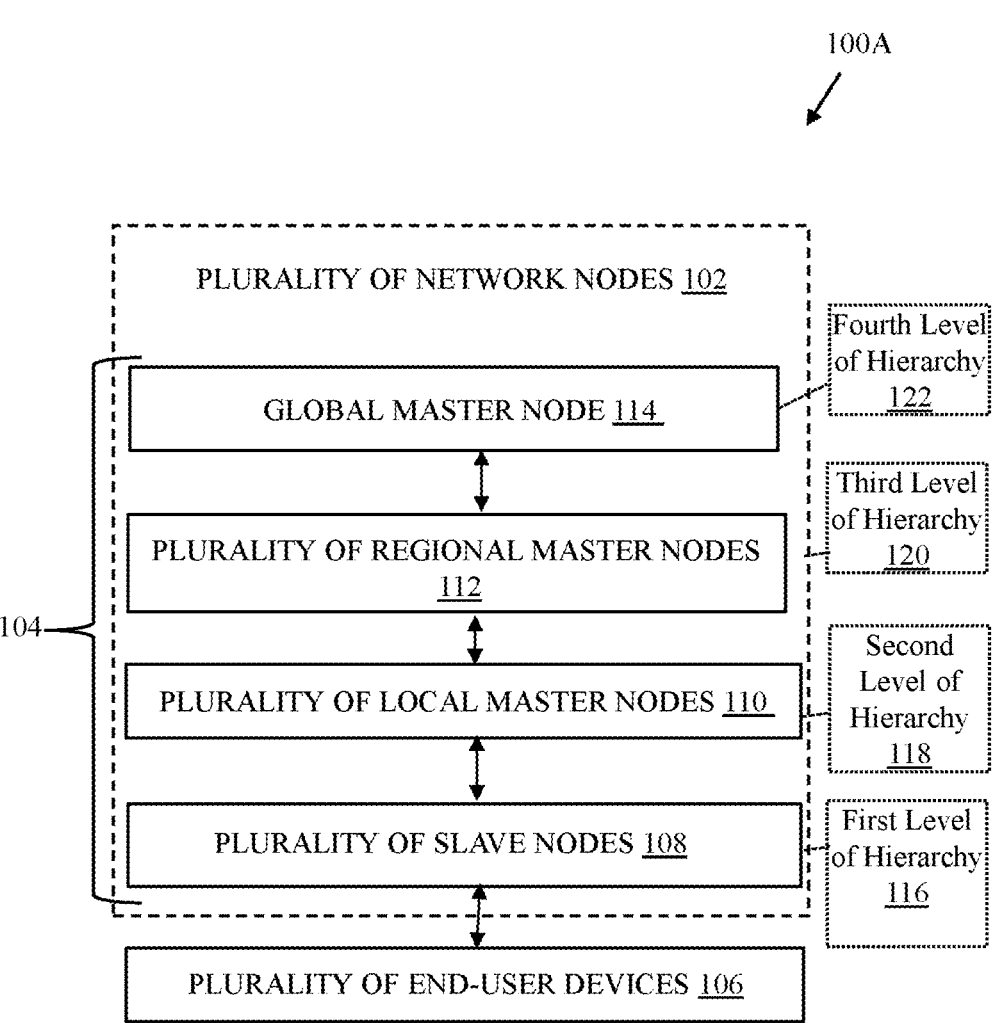
FIG. 1A is a diagram that illustrates an exemplary communication system, in accordance with an exemplary embodiment of the disclosure.

FIG. 1A is a diagram that illustrates an exemplary communication system, in accordance with an embodiment of the disclosure. With reference to FIG. 1A, there is shown a communication system 100A. The communication system 100A may include a plurality of network nodes 102 that are interconnected in a hierarchical communication network 104. The plurality of network nodes 102 may further include a plurality of slave nodes 108, a plurality of local master nodes 110, a plurality of regional master nodes 112, and a global master node 114. There is further shown a plurality of end-user devices 106 that may be communicatively coupled to the plurality of slave nodes 108.

In the communication system 100A, the plurality of slave nodes 108 may be at a first level of hierarchy 116 in the hierarchical communication network 104, the plurality of local master nodes 110 may be at a second level of hierarchy 118 in the hierarchical communication network 104, the plurality of regional master nodes 112 may be at a third level of hierarchy 120 in the hierarchical communication network 104, and the global master node 114 may be at a fourth level of hierarchy 122 in the hierarchical communication network 104.

The communication system 100A may also be referred to as a wireless communication system with hierarchical master-slave architecture. The communication system 100A may be a multi-layered and hierarchical network structure, such as the hierarchical communication network 104. Each layer in the hierarchical communication network 104 may include the plurality of network nodes 102 with distinct roles that collectively may ensure optimal data processing, communication, and control.

The plurality of end-user devices 106 may include suitable logic, circuitry, and interfaces that may be configured to communicate with the plurality of slave nodes 108. In an implementation, the plurality of end-user devices 106 may correspond to a wireless device, such as a client device or telecommunication hardware used by an end-user to communicate with other nodes or devices. In an example, each end-user device from the plurality of end-user devices 106 may refer to a combination of a mobile equipment with a subscriber identity module (SIM). Examples of the plurality of end-user devices 106 may include, but are not limited to a smartphone, a satellite phone, a tactical wireless communication device (e.g., used by military personnel), a laptop, a customer premise equipment, a virtual reality headset, an augmented reality device, a wireless modem, a home router, a Wi-Fi® enabled smart television (TV) or set-top box, a VoIP station, or any other customized hardware for wireless communication.

The plurality of slave nodes 108 may include suitable logic, circuitry, and interfaces that may be configured to communicate with the plurality of end-user devices 106 and the plurality of local master nodes 110. In an example, the plurality of slave nodes 108 may also be referred to as collectors, which are configured to acquire raw data from an operational environment, such as through the plurality of end-user devices 106. In an implementation, the plurality of slave nodes 108 may act as primary data collection points within a local area, provide sensory and situational data to higher nodes, such as the plurality of local master nodes 110. Examples of implementation of the plurality of slave nodes 108 may include, but are not limited to a mix of portable or non-portable wireless network nodes, such as fast-moving autonomous drones configured to perform local tasks, ground robots moving at high speeds, moving vehicles, repeater devices mounted on moving vehicles, IoT devices or sensors on fast-moving equipment, or other movable or non-movable repeater devices or wireless access points. The plurality of slave nodes 108 at the first level of hierarchy 116 may experience the highest mobility and most rapid position changes as compared to other nodes in the plurality of network nodes 102. In an example, each slave node from the plurality of slave nodes 108 may operate in the hierarchical communication network 104 under the guidance of one or more local master nodes of the plurality of local master nodes 110.

The plurality of local master nodes 110 may include suitable logic, circuitry, and interfaces that may be configured to communicate with the plurality of regional master nodes 112 and with the plurality of slave nodes 108. The plurality of local master nodes 110 at the second level of hierarchy 118 may have a second mobility range (i.e., medium mobility) less than a first mobility range of the plurality of slave nodes 108. Examples of implementation of the plurality of local master nodes 110 may include, but are not limited to a mix of portable or non-portable wireless network nodes, such as medium-altitude drones hovering over an area, mobile command vehicles, portable communication stations mounted on vehicles, temporary base stations on movable platforms, or relocatable network hubs The plurality of local master nodes 110 may have moderate mobility, moving occasionally to reposition or follow operation needs.

The plurality of regional master nodes 112 may include suitable logic, circuitry, and interfaces that may be configured to communicate with the plurality of local master nodes 110 and the global master node 114. In an implementation, each regional master node may also be referred to as an analyzer that may be configured to utilize artificial intelligence (AI) systems to analyze the data received from the global master node 114 and then transmit the analyzed data to the plurality of local master nodes 110. In an example, the plurality of regional master nodes 112 may handle the data from the plurality of local master nodes 110 before forwarding the data to the global master node 114. The plurality of regional master nodes 112 at the third level of hierarchy 120 may have a third mobility range (i.e., slow mobility) less than the second mobility range of the plurality of local master nodes 110. Examples of implementation of the regional master nodes 112 may include but are not limited to a mix of portable or non-portable wireless network nodes, such as high-altitude drones or airships, mobile regional command centers mounted on large vehicles, transportable communication centers, relocatable regional hubs on larger platforms, or mobile field operation centers. The plurality of regional master nodes 112 may have slower, planned movements over larger areas, typically repositioning less frequently than lower hierarchy levels, like the plurality of local master nodes 110.

The global master node 114 may include suitable logic, circuitry, and interfaces that may be configured to communicate with the plurality of regional master nodes 112. In an implementation, the global master node 114 may be communicatively coupled to each network node (i.e., communicatively coupled to the plurality of slave nodes 108, the plurality of end-user devices 106, the plurality of local master nodes 110, and the plurality of regional master nodes 112). In an example, the global master node 114 may be a remote management server that may be managed by a third party different from the service providers associated with a plurality of different wireless carrier networks (WCNs). In another example, the global master node 114 may be a data center that is managed by a third party, or jointly managed, or managed in coordination and association with one or more of the pluralities of different WCNs. In an implementation, the global master node 114 may be a central master (or global) cloud server or a master machine that may be a part of a data center that controls an array of other cloud servers communicatively coupled to the global master node 114 to balance load, running customized applications, and efficient data management. In an implementation, the global master node 114 may manage the entire country's mobile infrastructure and communicate with international networks. Examples of implementation of the regional master nodes 112 may include but are not limited to a central command and control facility node, a main network operations center node, a primary routing facility node, or a core infrastructure hub node. The global master node 114 at the fourth level of hierarchy 122 may remain relatively static with minimal mobility requirements, providing stable network coordination.

In operation, the plurality of slave nodes 108 at the first level of hierarchy 116 in the hierarchical communication network 104 may be configured to establish communication with the plurality of local master nodes 110 and the plurality of end-user devices 106. In an implementation, each end-user device (e.g., a mobile phone or other user equipment) may be carried by one or more users who may move in an operational environment, for example, in a building, an open space, or in a vehicle. Therefore, each end-user device may periodically or continuously change corresponding locations and may require a dynamic wireless communication system to maintain connectivity. Furthermore, the plurality of slave nodes 108 may be optimized for high-density deployments to support a large number of end-user devices in a confined area. Furthermore, the plurality of slave nodes 108 may be configured to establish wireless communication with the plurality of local master nodes 110 and the plurality of end-user devices 106 over diverse paths that may be adjusted dynamically to maintain robust links (one or more links concurrently in one or more different frequencies). In addition, each slave may be configured to acquire raw data from an operational environment and the plurality of end-user devices 106. Furthermore, each slave node may be configured to act as the primary data collection point within a corresponding local area and communicate sensory and situational data to its upstream node, i.e., to the plurality of local master nodes 110 to support a first mobility range (highest mobility among other levels of hierarchy) to manage end-user devices movement within an immediate coverage area.

In accordance with an embodiment, the plurality of slave nodes 108 at the first level of hierarchy 116 may be configured to establish communication with the plurality of end-user devices 106 using mobility-aware beam patterns. The mobility-aware beam patterns may be generated by dual-polarized phased array antennas arranged in a circular configuration at each of the plurality of slave nodes 108. After establishing communication, the plurality of plurality of slave nodes 108 may further implement mobility-aware data acquisition. In the mobility-aware data acquisition, the plurality of slave nodes 108 may dynamically adjust processing of data acquired based on velocity vectors of connected end-user devices. For example, a first level of data compression may be applied to data input received from high-mobility end-user devices and a second level of data compression may be applied for comparatively slower or stationary end-user devices. The first level of data compression may be greater (i.e., more aggressive) than the second level of data compression. Such mobility-optimized techniques (e.g., the mobility-aware data acquisition and the mobility-aware beam patterns) may enhance network performance in mixed-mobility environments compared to conventional networks that apply uniform processing regardless of node mobility characteristics.

In accordance with an embodiment, the plurality of local master nodes 110 at the second level of hierarchy 118 in the hierarchical communication network 104 may be configured to establish communication (e.g., wireless communication) with the plurality of regional master nodes 112 (e.g., via one or more wireless links). Furthermore, after establishing the communication, the plurality of local master nodes 110 may be configured to analyze the data received from the plurality of slave nodes 108 to derive broader insight from the received data. In an example, the received data may include user connectivity data (e.g., mobile phone signals in a 5G network), sensor data (e.g., smart city IoT sensors), or local processing results (e.g., artificial intelligence (AI) edge computing). Thereafter, the plurality of local master nodes 110 may be configured to filter and preprocess the received data to contribute to regional strategy and command decisions. Thereafter, the processed data may be transmitted to the plurality of regional master nodes 112 by the plurality of local master nodes 110. In an implementation, the plurality of local master nodes 110 may be configured to encrypt and authenticate the data before sending the data to the plurality of regional master nodes 112, which prevents cyberattacks and unauthorized data access, for example, in 5G networks, IoT, wireless backhaul mesh networks, and cloud computing based networks. The plurality of local master nodes 110 may be configured to transmit only relevant data to the plurality of regional master nodes 112, which may be beneficial to reduce congestion.

In an exemplary implementation, the plurality of local master nodes 110 may be configured to perform mobility-adaptive filtering and preprocessing of the received data from the plurality of slave nodes 108 to contribute to regional strategy and command decisions. The plurality of local master nodes 110 may employ a hierarchical filter bank where filter parameters may be dynamically adjusted based on the mobility classification (e.g., velocity vectors) of the originating slave nodes. For data originating from high-mobility slave nodes, a connected local master node may apply temporal coherence filters configured to extract meaningful patterns despite rapid environmental changes, whereas data from stationary slave nodes may undergo spatial consistency filtering that may leverage the stability of fixed-position measurements. This mobility-differentiated preprocessing may enable the extraction of insights that would remain undetectable in conventional systems that apply uniform filtering regardless of source node mobility characteristics, thereby providing improved situational awareness for strategic decision-making at higher hierarchical levels.

In accordance with an embodiment, the plurality of regional master nodes 112 at the third level of hierarchy 120 in the hierarchical communication network 104 may be configured to establish communication with the global master node 114. In an implementation, the plurality of regional master nodes 112 at the third level of hierarchy 120 in the hierarchical communication network 104 may be configured to establish the communication with the global master node 114 (in this case, either through wired or wireless links as the global master node 114 may be a static node). In an implementation, each node of the plurality of regional master nodes 112 may receive and consolidate the data from the plurality of local master nodes 110, for example, to perform traffic optimization, compression, encryption, and filtering to reduce redundant or unnecessary data before transmission to the global master node 114. Thereafter, each regional master node from the plurality of regional master nodes 112 may be configured to perform more complex data analysis and contribute to regional strategy and command decisions before transmission of the data to the global master node 114. For example, each regional master node may implement a multi-tier analytics framework where the first analysis tier may process mobility-related metrics across all connected local master nodes coverage areas to identify inter-area movement patterns invisible at lower hierarchical levels. The second analysis tier may execute area-based correlation that may detect signal anomalies spanning multiple local master nodes coverage areas, thereby enabling identification of systematic interference patterns or coordinated jamming attempts that may affect multiple network segments concurrently. The third analysis tier may perform a predictive resource allocation operation to analyze historical mobility traces to forecast user distribution changes across the network, allowing preemptive reconfiguration of network resources before congestion occurs. Additionally, each regional master node may employ specialized beam pattern coordination operation in which beam directions from multiple local master nodes may be collectively optimized to create complementary coverage patterns rather than operating independently, thereby minimizing coverage gaps and interference zones between adjacent coverage areas.

Beneficially, in accordance with an embodiment, the global master node 114 at a fourth level of hierarchy 122 in the hierarchical communication network 104 may be configured to adjust data routing paths throughout the hierarchical communication network 104 based on a mobility handling parameter associated with each level of hierarchy in the hierarchical communication network 104. In an example, the data routing paths may correspond to a specific sequence of nodes, such as the plurality of slave nodes 108, the plurality of local master nodes 110, the plurality of regional master nodes 112, and the global master node 114 through which data packets travel in the hierarchical communication network 104. Furthermore, in the hierarchical communication network 104, the selection of a given data routing path may ensure that the data is transmitted efficiently, avoiding congestion and reducing latency. In an example, the data routing paths may be dynamically adjusted based on network conditions, mobility, and traffic load. For example, when a group of end-user devices moves from a coverage area served by a first local master node to a coverage area approaching a second local master node, the global master node 114 may detect this mobility pattern and preemptively establish alternative routing paths through both the local master nodes. The global master node 114 may then gradually shift traffic from paths traversing the first local master node to paths through the second local master node as the group of end-user devices may complete their transition, thereby maintaining continuous connectivity without abrupt handoffs. Similarly, if a regional master node experiences high traffic load due to localized data-intensive applications, the global master node 114 may temporarily reroute traffic from less critical applications through other regional master nodes, thereby preventing congestion while preserving bandwidth for priority services. Additionally, if environmental conditions such as interference or signal blockage affect connections between specific nodes, the global master node 114 may dynamically reconfigure routing paths to bypass affected areas, leveraging the hierarchical structure to identify and implement optimal alternative routes that maintain service quality despite changing network conditions.

In accordance with an embodiment, the mobility handling parameter may refer to a set of configuration values and operational thresholds that govern how nodes at each hierarchical level respond to and manage device movement. In an example, the mobility handling parameter may include a node velocity (e.g., speed of movement), a signal strength fluctuation (e.g., due to mobility), a handover frequency (e.g., number of transitions between access points), a doppler shift impact (e.g., frequency changes caused by movement), a network congestion status (e.g., load balancing requirements). Furthermore, the global master node 114 may use the mobility handling parameter to optimize the data routing paths, ensuring seamless connectivity and reducing latency.

In accordance with an embodiment, the global master node 114 may adjust the data routing paths for the plurality of slave nodes 108 based on the mobility handling parameter associated with the first level of hierarchy 116 in the hierarchical communication network 104. For example, the global master node 114 may adjust the data routing paths for the plurality of slave nodes 108 by monitoring mobility parameters from the plurality of slave nodes 108. The mobility parameters may indicate an extent of movement of the end-user devices that may switch between different slave nodes or a relative motion of a given slave node and its connected end-user device(s) (e.g., the given slave node may be a drone or a repeater mounted on a vehicle connected to one or more end-user devices in motion). In an implementation, if at least one slave node from the plurality of slave nodes 108 move quickly (e.g., when the slave node may be a repeater mounted on a car), then a packet size as well as data rate may be reduced to a first packet length to minimize transmission errors. The system 100A may selectively apply packet size and data rate reductions only to the specific mobile nodes (like car-mounted repeaters) while maintaining higher throughput for stationary nodes. Furthermore, the global master node 114 may adjust the data routing paths by dynamically adjusting the data rate based on real-time link quality. In accordance with an embodiment, the global master node 114 may be configured to adjust the data routing paths for the plurality of slave nodes 108 based on doppler shift. In an example, the doppler shift may occur when relative motion exists between a transmitter and receiver, causing the received signal frequency to differ from the transmitted frequency. In an example, one or more slave nodes of the plurality of slave nodes 108 may be move and the signals transmitted or received by such moving slave nodes may experience a frequency shift. In an example, the magnitude of such frequency shift may be directly proportional to a relative velocity between a slave node and a UE. Furthermore, a doppler shift mitigation may be used by the global master node 114 to ensure smooth handovers between the plurality of slave nodes 108 and the plurality of end-user devices 106 (e.g., moving mobile devices). In an implementation, the global master node 114 may be configured to re-route the data transmission through alternative local master nodes not only to prevent congestion but to provide a reliable connection but estimating at which location the UE may reach in an upcoming timepoint. Thus, the global master node 114 may ensure seamless handovers with reduced dropped connections in high-mobility scenarios. Furthermore, the global master node 114 may also be beneficial to minimize latency for real-time applications (e.g., video calls and cloud gaming). Furthermore, by adjusting the data routing path for the plurality of slave nodes 108, the global master node 114 may improve signal quality by dynamically adjusting transmission parameters, reducing retransmissions, and improving energy efficiency for IoT and mobile devices.

In accordance with an embodiment, the global master node 114 may further adjust the data routing paths for the plurality of slave nodes 108 based on pilot tone injection. In an example, the pilot tone injection may correspond to an operation where known reference signals are deliberately transmitted at specific frequencies within the hierarchical communication network 104. In such example, the pilot tone injection may serve as calibration references that allow the global master node 114 to measure channel characteristics of the hierarchical communication network 104. In addition, in the hierarchical communication network 104, the global master node 114 may coordinate the transmission of the pilot tone injection across different frequency bands. Furthermore, the plurality of slave nodes 108 and other network nodes or UEs may detect the pilot tone injection and report back measurements to provide real-time information about signal strength, phase shifts, interference levels, and multipath effects throughout the network.

In an implementation, the global master node 114 may be configured to perform routing optimization through the pilot tone injection across the hierarchical communication network 104. The global master node 114 may be configured to coordinate the transmission of known reference signals (i.e., pilot tones) at specific frequencies throughout the hierarchical communication network 104. Thereafter, the known reference signals may be received by the plurality of slave nodes 108, which may further analyze the received known reference signals. Such known reference signals (i.e., the pilot tones) may serve as calibration references that may enable precise measurement of channel characteristics include signal strength, phase distortion, interference levels, and multipath effects. Thereafter, the global master node 114 may be configured to collect pilot tone injector information from the plurality of slave nodes 108. Thereafter, the global master node 114 may be configured to create a comprehensive real-time or near real-time channel quality map in the hierarchical communication network 104 to identify optimal transmission paths and signal fading regions. In an implementation, the global master node 114 may be configured to analyze the collected pilot tone injector information, where the analysis may provide interference patterns or degrading channel conditions on current routes. The global master node 114 may then proactively re-route traffic through different paths, coordinate with the plurality of regional master nodes 112 to establish alternative routes and instruct the plurality of local master nodes 110 to prepare backup channels. Thus, the pilot tone injection may be beneficial to continuously adapt to changing RF environments, which may improve data path selection, reduce packet loss, and further enhance network performance even in dynamically changing conditions.

In accordance with an embodiment, the data routing paths may be adjusted by the global master node 114 for the plurality of slave nodes 108 further based on data packet length adjustment. In an implementation, the length of the data packets may be adjusted dynamically based on network conditions. Furthermore, the hierarchical communication network 104 may implement a packet length optimization operation where the global master node 114 may be configured to continuously or periodically analyze transmission success rates across different packet sizes. Thereafter, based on the success rates, the global master node 114 may be configured to define and configure a data packet length tailored to specific network regions, mobility scenarios, and traffic types. In addition, the global master node 114 may be configured to perform adaptive route selection, in which stable network paths may be configured to carry longer data packets (i.e., data packets greater than a defined threshold) for maximum throughput. Furthermore, routes with intermittent challenges may be assigned to shorter data packets (i.e., data packets smaller than the defined threshold) to minimize errors, and high-priority control traffic is directed through ultra-reliable short packet routes. The global master node 114 may be configured to improve network performance through sophisticated multi-path adaptive strategies, for example, by transmitting the longer data packets (i.e., data packets greater than the defined threshold) over stable connections, duplicating critical or high priority data using the shorter data packets across alternate routes, and dynamically fragmenting the data packets based on route quality. Additionally, the global master node 114 may be configured to actively manage congestion by dynamically adjusting the data packet lengths to match available bandwidth, route traffic through data paths that maintain optimal packet efficiency. This is how the global master node 114 may be configured to adjust the data routing paths for the plurality of slave nodes 108 based on data packet length adjustment during congestion periods to improve delivery probability, with improved performance across diverse operating conditions.

In an implementation, the global master node 114 may be configured to acquire real-time mobility data from the plurality of slave nodes 108 for the adjustment of the data routing paths for the plurality of slave nodes 108 based on the mobility handling parameter associated with the first level of hierarchy 116. The global master node 114 may be configured to detect high-mobility scenarios (e.g., end-user devices moving across W-Fi® zones, vehicle switching from one 5G cell to another cell, and the like). Thereafter, the global master node 114 may be configured to perform adaptive packet length adjustment, such as the global master node 114 may be configured to control the plurality of slave nodes 108 to use smaller packets (i.e., packet length less than the defined threshold) for moving end-user devices (e.g., vehicles) to minimize transmission errors. In an example, the global master node 114 may be configured to control the plurality of slave nodes 108 to use larger packets (i.e., packet length greater than the defined threshold) for stationary users (e.g., indoor Wi-Fi users) to maximize efficiency. Thereafter, the global master node 114 may be configured to control the plurality of slave nodes 108 to adjust channel selection and bandwidth usage to prevent interference and congestion. In addition, the global master node 114 may be configured to control the plurality of slave nodes 108 to predict mobility patterns and pre-assign new network nodes (e.g. access points) before handover occurs.

In accordance with an embodiment, the plurality of network nodes 102 may be configured to utilize different packet lengths for data communication for each level of hierarchy based on the mobility handling parameter associated with each level of hierarchies in the hierarchical communication network 104. In an implementation, the plurality of slave nodes 108 at the first level of hierarchy 116 may be configured to utilize a first packet length for data communication based on the mobility handling parameter associated with the first level of hierarchy 116 in the hierarchical communication network 104. In such an example, the plurality of slave nodes 108 may be configured to use the shortest packet lengths (e.g., 128 bytes) to handle frequent updates from the plurality of end-user devices 106. Similarly, the plurality of local master nodes 110 at the second level of hierarchy 118 may be configured to define and utilize a second packet length for data communication based on the mobility handling parameter associated with the second level of hierarchy 118 in the hierarchical communication network 104. In such a case, the plurality of local master nodes 110 at the second level may be configured to use medium-short packets (e.g., 256 bytes) to communicate with the plurality of slave nodes 108. In addition, the plurality of regional master nodes 112 at the third level of hierarchy 120 may be configured to utilize a third packet length for data communication based on the mobility handling parameter associated with the third level of hierarchy 120 in the hierarchical communication network 104. In such a case, the plurality of regional master nodes 112 may be configured to employ medium-long packets (e.g., 512 bytes) for regional data consolidation from the plurality of local master nodes 110. Furthermore, the global master node 114 at the fourth level of hierarchy 122 may be configured to utilize a fourth packet length for data communication based on the mobility handling parameter associated with the fourth level of hierarchy 122 in the hierarchical communication network 104. In an example, the global master node 114 at the fourth level may be configured to use a longest packet length (e.g., 1024 bytes) for network-wide communications. Such a graduated packet length strategy may be beneficial to optimize network performance by matching packet sizes to each level processing capabilities and mobility requirements, which may reduce latency, and improve bandwidth utilization.

In accordance with an embodiment, the plurality of network nodes 102 may be configured to utilize a packet length less than a defined threshold for data communication at the first level of hierarchy 116 in the hierarchical communication network 104 when one or more end-user devices of the plurality of end-user devices 106 move rapidly greater than a defined speed limit to reduce an influence of channel variations and packet errors. In an implementation, the hierarchical communication network 104 may implement an adaptive packet length control mechanism specifically optimized for high-mobility scenarios. For example, when end-user devices move faster than a defined speed limit, then the communication system 100A may automatically utilize shorter packet lengths (i.e., below the defined threshold) at the first level of hierarchy 116, where the plurality of slave nodes 108 may interface directly with the plurality of end-user devices 106. Such real-time adaptation may be useful because the rapid movement of one or more end-user devices may cause frequent channel variations and may increase the probability of transmission errors. For example, if the end-user device 106A moves at high speeds (e.g., in a vehicle), then the slave node 108A may be configured to reduce the corresponding packet length from standard 128 bytes to 64 bytes or less. Such a reduction in packet length may be beneficial to decrease the probability of packet corruption during transmission, reduce retransmission rates, minimize latency, and maintain reliable communication despite challenging channel conditions. In an example, the plurality of local master nodes 110, the plurality of regional master nodes 112, and the global master node 114 may continue to operate with corresponding standard packet lengths since such network nodes may not be directly affected by the mobility of the plurality of end-user devices 106.

In accordance with an embodiment, the plurality of network nodes 102 may be configured to utilize a packet length greater than the defined threshold for data communication in the hierarchical communication network 104 when one or more end-user devices of the plurality of end-user devices 106 or one or more network nodes of the plurality of network nodes 102 may be stationary or move slowly less than a defined speed limit to maximize data throughput. In an implementation, the hierarchical communication network 104 may be configured to use an optimized packet length operation or low-mobility or stationary scenarios. For example, when one or more end-user devices move slower than the defined speed limit or remain stationary, then the communication system 100A may leverage larger packet lengths (i.e., above a defined threshold) across all hierarchy levels. In an example, the packet length may be increased from 128 bytes to 512 bytes or more at the first level of hierarchy 116, with proportional increase at higher levels. Such adaptation of an increase in packet size may be beneficial to maximize data throughput because stable channel conditions allow for reliable transmission of larger packets and reduce overhead from packet headers and increase overall network efficiency.

In accordance with an embodiment, the global master node 114 may be configured to track handover events between the plurality of local master nodes 110 and predict network congestion for the adjustment of the data routing paths for the plurality of local master nodes 110 based on the mobility handling parameter associated with the second level of hierarchy 118. In an implementation, if one or more slave nodes from the plurality of slave nodes 108 move into a vicinity area from a local master node to another local master node, then the global master node 114 may be configured to adjust the data routing paths for the plurality of local master nodes 110 to perform load-balancing to redistribute traffic to another local master node. In an implementation, the global master node 114 may be configured to dynamically adjust the data routing paths by adjusting the frequency and power levels of repeaters corresponding to each of the local master nodes from the plurality of local master nodes 110 to compensate for signal interference. In an implementation, the global master node 114 may be configured to perform adaptive packet scheduling to optimize the data routing paths between the plurality of local master nodes 110 and the data routing paths for different data types (e.g., prioritize voice/video over background data). In an example, the global master node 114 may also be configured to select low-latency data paths to optimize the data routing paths for end-user devices by dynamically switching between fiber-optic backhaul and wireless links (e.g., mmWave or satellite). Thus, the global master node 114 may prevent network congestion, ensure stable connections for large numbers of mobile users, which in turn may improve signal coverage and reduce dead zones in high-density deployments. In addition, the global master node 114 may also optimize bandwidth usage, ensuring smooth data transmission for 5G, Wi-Fi 7, and IoT applications, which may also reduce jitter and packet loss, improve quality for real-time services, such as VOIP and streaming.

In an implementation, the global master node 114 may monitor the plurality of local master nodes 110 that aggregate traffic from the plurality of slave nodes 108. The global master node 114 may detect network congestion, interference, and sudden mobility surges (e.g., a crowd moving into a stadium). Furthermore, the global master node 114 may be configured to use adaptive data rate scaling to adjust the data routing paths for the plurality of local master nodes 110 by using modulation adjustment to optimize data rates based on network load. The global master node 114 may reduce the data rate in congested areas to avoid packet collisions. Furthermore, the global master node 114 may also increase the data rate in low-traffic areas for improved data transmission. In an example, the global master node 114 may be configured to use edge caching to store frequently accessed data closer to the end-user devices, such as to adjust data routing paths for the plurality of local master nodes 110 by reducing overall load. Therefore, by virtue of adjusting the data routing path, the global master node 114 may reduce network congestion, ensuring smooth operation in high-density environments, which may improve overall network performance by dynamically optimizing data rates and ensuring reliable connectivity for end-user devices.

In accordance with an embodiment, the global master node 114 may utilize network-wide mobility analytics from the plurality of regional master nodes 112 for the adjustment of the data routing paths for the plurality of regional master nodes 112. In an example, if a region or an area experiences heavy mobility (e.g., a stadium during a sports event), then the global master node 114 may adjust the data routing paths for the plurality of regional master nodes 112 by using adaptive network slicing to allocate dedicated resources for high-priority users. Therefore, in such scenarios, the global master node 114 may be configured to adjust the data routing paths by using multi-path routing to find one or more alternative paths across the plurality of regional master nodes 112, ensuring minimum latency for international connections. In the case of high-speed movement (e.g., an aircraft with satellite connectivity), the global master node 114 may be configured to adjust the data routing paths by using adaptive frequency adjustments that may mitigate Doppler shift effects. The redundant routing paths may be preemptively adjusted by the global master node 114 to handle failures in case of high mobility stress (e.g., disaster recovery scenarios). By adjustment of the data routing paths for the plurality of regional master nodes 112, the global master node 114 may ensure global connectivity, reducing latency for cross-region applications (e.g., cloud gaming and remote work).

In an implementation, the global master node 114 may adjust the data routing paths for the plurality of regional master nodes 112 based on the mobility handling parameter associated with the third level of hierarchy 120 in the hierarchical communication network 104. For example, the global master node 114 may analyze traffic from the plurality of regional master nodes 112. Thereafter, the global master node 114 may detect mobility events (e.g., a fleet of self-driving cars moving across cities, or migration of end-user devices from one zone to another zone). Furthermore, the global master node 114 may perform mitigation of the Doppler shifts for large-scale mobility, for example, by using frequency correction in mobile repeaters corresponding to the plurality of regional master nodes 112 to counteract the effects of Doppler shift. In an implementation, the global master node 114 may be configured to adjust the data routing paths for the plurality of regional master nodes 112 based on AI-based traffic prediction and prediction of data surges. The prediction of data surges may be based on historical patterns. The global master node 114 may be further configured to use cloud-based Software-Defined Networking (SDN) controllers to distribute traffic efficiently in the plurality of regional master nodes 112. In an implementation, the global master node 114 may be further configured to perform secure data transmission and handover between the plurality of regional master nodes 112 by implementation of end-to-end encryption for seamless and secure data transmission.

In accordance with an embodiment, each level of hierarchy in the hierarchical communication network 104 may be associated with a different mobility range to support one or more mobility operations of the plurality of end-user devices 106. In accordance with an embodiment, the first level of hierarchy 116, the second level of hierarchy 118, and the third level of hierarchy 120 in the hierarchical communication network 104 may have a first mobility range, a second mobility range, and a third mobility range respectively. The first mobility range associated with the first level of hierarchy 116 is higher than the second mobility range associated with the second level of hierarchy 118. Moreover, the second mobility range may be associated with the second level of hierarchy 118 and higher than the third mobility range associated with the third level of hierarchy 120. In an implementation, the first level of hierarchy 116 in the hierarchical communication network 104 may be associated with the first mobility range to support one or more mobility operations of the plurality of end-user devices 106.

In accordance with an embodiment, each level of hierarchy in the hierarchical communication network 104 may be associated with a different mobility range to support one or more mobility operations of the plurality of end-user devices 106. The hierarchical communication network 104 may implement a graduated mobility support architecture wherein each level may be specifically optimized for different velocity ranges and movement characteristics. For example, at the first level of hierarchy 116, the slave nodes 108 may support a first mobility range that encompasses high-velocity scenarios (specifically 0-500 mph), enabling connectivity for end-user devices 106 in fast-moving vehicles, aircraft, or other rapidly moving platforms. This high mobility support may be achieved with rapid beam switching capabilities (with transition times, for example, <10 microseconds, which corresponds to the time required for a 500 mph object to move approximately 0.7 mm), shortened packet lengths (typically 0.5-2 milliseconds transmission time, selected to ensure that channel coherence time exceeds packet duration even at maximum velocity), Doppler shift compensation using dual-polarized pilot tone injection (detecting frequency shifts up to, for example, +1.5 kHz at 5 GHz carrier frequency), and circular-arranged phased array antennas providing 360-degree coverage without mechanical rotation (with antenna elements spaced at precise intervals to maintain coherent beamforming at high angular velocities).

In accordance with an embodiment, at the second level of hierarchy 118, the plurality of local master nodes 110 may support a second mobility range (specifically 0-100 mph) that accommodates medium-velocity scenarios such as ground vehicles and slow-flying aerial platforms. These nodes may implement medium packet lengths (typically 2-10 milliseconds), soft boundary handoff operation for seamless coverage transitions, and adaptive polarization configurations that may adjust to changing environmental conditions. For example, when a military convoy moving at 60 mph passes through the coverage area of a local master node, this local master node may dynamically adjust its beam patterns to maintain connectivity despite the vehicles' movement, while pre-coordinating with adjacent local master nodes to ensure seamless transitions as the convoy approaches coverage boundaries.

In accordance with an embodiment, at the third level of hierarchy 120, the plurality of regional master nodes 112 may support a third mobility range (specifically 0-25 mph) optimized for slower-moving or stationary platforms, including tactical command posts, temporary installations, or personnel on foot. These nodes may utilize longer packet lengths (typically 10-50 milliseconds) to maximize throughput, implement more sophisticated encoding schemes that might be impractical at higher mobility levels, and focus on stable backhaul connections rather than rapid adaptability. For instance, the plurality of regional master node 112 might establish stable connections to multiple local master nodes supporting a static command center and surrounding dismounted troops moving at walking speed, providing consistent high-bandwidth connectivity optimized for this limited-mobility scenario. The graduated mobility support across hierarchical levels enables the hierarchical communication network 104 to simultaneously accommodate diverse mobility requirements within a single cohesive architecture, from stationary installations to hypersonic platforms, without sacrificing performance. At the fourth level of hierarchy 122, the global master node 114 may support a minimal mobility range (specifically 0-2 mph) optimized for stationary or near-stationary deployments.

The communication system 100A may implement a three or four-tiered mobility structure where the first level of hierarchy 116 in the hierarchical communication network 104 may support the highest mobility range. Similarly, the second level of hierarchy 118 in the hierarchical communication network 104 may support medium mobility and the third level of hierarchy 119 in the hierarchical communication network 104 may handle the lowest mobility requirements. Such mobility ranges may be achieved through a combination of two or more of: dynamic packet length adjustments based on the movement as well as speed of the end-user devices, or a Doppler shift compensation adjusted based on mobility needs at each level.

In accordance with an embodiment, the plurality of network nodes 102 may be further configured to concurrently operate in a plurality of frequency bands in the hierarchical communication network 104. Each network node may concurrently maintain active communication links across multiple frequency bands including mmWave (10-300 GHZ), 5 GHZ WLAN, 6 GHZ, 2.4 GHz, or sub-8 GHz bands, enabling the network to leverage band-specific advantages for different communication requirements. The higher frequency bands may be utilized for high-throughput, short-range communications, while lower frequency bands may provide extended coverage and superior obstacle penetration capabilities. The network nodes 102 may dynamically route traffic across the concurrent frequency links based on mobility conditions, with fast-moving nodes utilizing lower frequencies to maintain connectivity over greater distances.

In accordance with an embodiment, the global master node 114 may be configured to establish dual radio access networks in an analog data plane among the plurality of network nodes 102 in which a first radio access network of the dual radio access networks is established by use of a first frequency spectrum and a second radio access network is established by use of a second frequency spectrum lower than the first frequency spectrum. The first frequency spectrum may be a licensed or unlicensed mmWave spectrum that may operate in a range of 10-300 GHz and the second frequency spectrum may be one of a wireless local area network (WLAN) frequency spectrum or an industrial, scientific, and medical (ISM) spectrum. In an implementation, the hierarchical communication network 104 may implement the dual radio access network architecture managed by the global master node 114 to create two distinct but complementary wireless networks, such as the first radio access network and the second radio access network that operates simultaneously.

In accordance with an embodiment, the plurality of network nodes 102 may be configured to concurrently operate in a plurality of polarization types in the hierarchical communication network 104 and switch between the plurality of polarization types when an orientation or a velocity of an end-user device to which a corresponding network node is connected is changed to maintain a node-level signal reception greater than a defined threshold. Each or some of the plurality of network nodes 102 (e.g., the plurality of slave nodes 108, the plurality of local master nodes 110, and the plurality of regional master nodes 112) may employ dual-polarized phased array antennas configured to perform rapid polarization reconfiguration (<50 microseconds) between vertical, horizontal, slant, and circular polarization modes. For example, when a military vehicle equipped with an end-user device rotates during maneuvers, the communication system 100A (e.g., a given network node) may detect polarization-dependent signal fading and automatically switch from vertical to circular polarization, maintaining connectivity without interruption. Similarly, when aircraft-mounted devices accelerate beyond 200 mph, the serving network node may perform adaptive polarization diversity combining, where signals from orthogonal polarizations may be weighted and combined based on real-time quality metrics to counteract Doppler-induced polarization rotation effects. The plurality of network nodes 102 may further employ predictive polarization switching based on inertial measurement data received from end-user devices, enabling proactive reconfiguration before signal degradation occurs. This capability proves particularly valuable in battlefield scenarios where rapid movement and orientation changes would otherwise cause communication failures in conventional single-polarization systems.

In accordance with an embodiment, the global master node 114 may be configured to determine a beam steering direction and a polarization configuration for each wireless link in the hierarchical communication network 104 based on a network topology and a link condition parameter associated with each wireless link. The link condition parameter associated with each wireless link may comprise a comprehensive set of metrics that quantify the quality, reliability, and performance characteristics of individual communication links between network nodes. The link condition parameter may include one or more of: signal-to-noise ratio (SNR), signal-to-interference-plus-noise ratio (SINR), received signal strength indicator (RSSI), bit error rate (BER), packet error rate (PER), available bandwidth, current throughput, latency, jitter, multipath intensity profile, Doppler spread, coherence bandwidth, and polarization purity metrics. The link condition parameters may be continuously measured, aggregated, and reported to the global master node 114 via the telemetry information providing real-time visibility into the performance of each wireless link throughout the hierarchical communication network 104. The global master node 114 may analyze three-dimensional positions of other network nodes of the plurality of network nodes 102 to calculate beam directions that maximize coverage while minimizing interference. For example, when two slave nodes are positioned in close proximity, the global master node 114 may assign complementary beam steering angles (e.g., 45° and) 135° to their respective phased array antennas to minimize mutual interference while collectively covering the operational area. Similarly, the global master node 114 may determine polarization configurations based on measured link condition parameters. The links experiencing multipath interference (indicated by high delay spread values) may be assigned circular polarization to mitigate fading, while links affected by cross-polarization interference (identified through polarization purity metrics) may utilize orthogonal polarizations to enhance signal isolation. In dynamic battlefield scenarios where temporary obstructions appear (detected through sudden RSSI drops across multiple links), the global master node 114 may rapidly recalculate beam steering directions to establish alternative signal paths around obstacles, such as directing a given local master node to reflect signals off available structures to maintain connectivity when direct paths are blocked. The global master node 114 may further implement coordinated beam patterns where multiple nodes' beams are collectively shaped to create complementary coverage.

In accordance with an embodiment, the plurality of network nodes 102 may be configured to sense and process telemetry information based on a level of hierarchy associated with each network node of the plurality of network nodes 102. In an implementation, the hierarchical communication network 104 may implement a level-specific telemetry processing where each level of hierarchy may handle different aspects of telemetry data based on the corresponding hierarchical position. In an example, at the first level of hierarchy 116, each slave node from the plurality of slave nodes 108 may collect and process basic telemetry data directly from the corresponding end-user node from the plurality of end-user devices 106, such as signal strength, basic device health metrics, and immediate environmental conditions. In addition, the plurality of local master nodes 110 at the second level of hierarchy 118 may aggregate and process more complex telemetry information as received from the plurality of slave nodes 108, including network performance metrics, traffic patterns, and device mobility trends within their local area. Thereafter, at the third level of the hierarchy, the plurality of regional master nodes 112 may analyze broader telemetry patterns across multiple local zones, processing data about regional network health, resource utilization, and cross-zone mobility patterns. Finally, the global master node 114 may process network-wide telemetry information, analyzing the overall performance of the communication system 100A, large-scale mobility trends, and network-wide resource optimization. As a result, the hierarchical telemetry processing in the hierarchical communication network 104 may provide efficient resource utilization, such as each level processes only relevant data with distributed processing.

In accordance with an embodiment, the plurality of local master nodes 110 at the second level of hierarchy 118 may be configured to detect a local interference and congestion event based on the obtained telemetry information from the plurality of slave nodes 108. Each local master node 110 may continuously or periodically analyze telemetry streams from its associated slave nodes. The telemetry information may include signal-to-noise ratios, packet error rates, retry counters, channel utilization metrics, and interference power measurements across multiple frequency bands. The plurality of local master nodes 110 may perform a multi-dimensional anomaly detection operation that may correlate these metrics across time, frequency, and spatial domains to identify interference patterns that may not be detectable through single-dimension analysis. The multi-dimensional anomaly detection operation may employ a hierarchical threshold where primary indicators such as sudden increases in error rates may trigger deeper analysis of secondary metrics including spectral energy distribution and polarization-specific signal degradation. Based on detection of a significant deviation from established baseline performance metrics within its coverage area, the plurality of local master nodes 110 may classify the event as either a congestion event (characterized by high channel utilization with normal signal-to-noise ratios) or an interference event (identified by degraded signal-to-noise ratios across multiple slave nodes with spatial correlation). This classification may then trigger appropriate mitigation responses including RF parameter calibration, beam reorientation, polarization switching, or traffic rerouting through alternative paths within the hierarchical communication network 104.

Figure 1B:
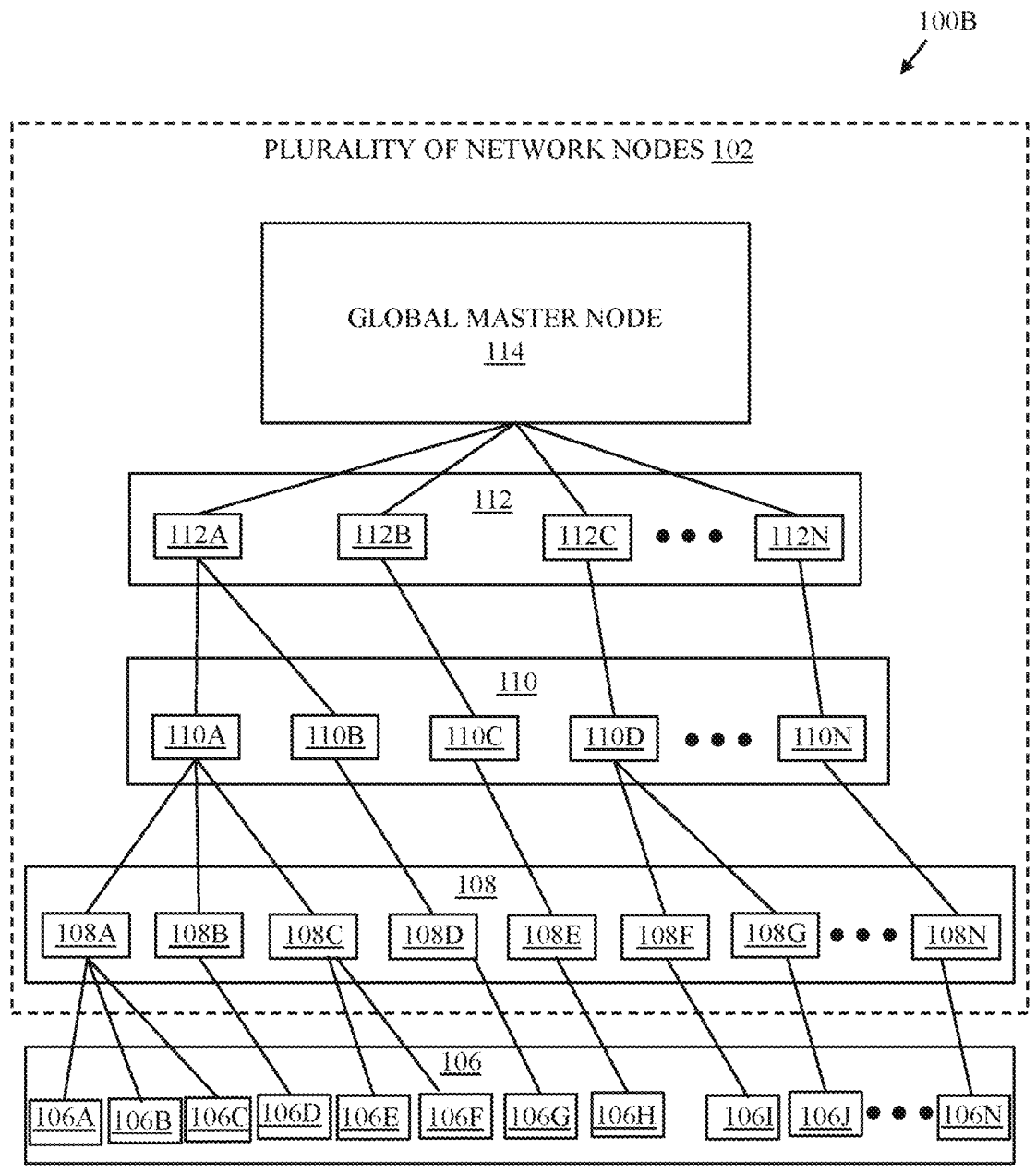
FIG. 1B is a diagram that illustrates an exemplary communication system, in accordance with another embodiment of the disclosure.

FIG. 1B is a diagram that illustrates an exemplary communication system, in accordance with an exemplary embodiment of the disclosure. With reference to FIG. 1B, there is shown a communication system 100B. FIG. 1B is explained in conjunction with elements from FIG. 1A. The communication system 100B may include the plurality of network nodes 102 that are interconnected in the hierarchical communication network 104. In this case, the global master node 114 may be communicatively coupled to the plurality of regional master nodes 112. The plurality of regional master nodes 112 may be sandwiched between the global master node 114 and the plurality of local master nodes 110. The plurality of local master nodes 110 may be further sandwiched between the plurality of regional master nodes 112 and the plurality of slave nodes 108. The plurality of slave nodes 108 may be communicatively coupled to the plurality of local master nodes 110 as well as the plurality of end-user devices 106.

The plurality of network nodes 102 may be strategically deployed across an operational area in accordance with predefined service requirements, wherein some type of nodes, such as slave nodes, local master nodes, and regional master nodes, may comprise an array of dual-polarized phased array antennas configured for directional wireless communication with dynamically adjustable beam patterns for 360-degree coverage. During the initialization phase, each network node may broadcast a capability announcement packet that may include operational parameters, such as mobility classification values, available processing resources, antenna specifications with polarization capabilities, and supported frequency bands for multi-link operation. Subsequently, each node may execute a neighbor discovery protocol to establish preliminary wireless connections with proximate nodes within effective communication range. The connections may utilize adaptive modulation and coding schemes based on measured link quality parameters, thereby forming an initial mesh topology that may be hierarchically optimized through the artificial neural network model at the global network node. The artificial neural network model may periodically or continuously evaluate node positioning, signal strength characteristics, and prevailing RF environmental conditions to determine optimal hierarchical placement within the four-tiered network architecture of the hierarchical communication network 104.

In an implementation, the plurality of slave nodes 108 may be firstly configured to establish communication with the plurality of end-user devices 106. Thereafter, each slave node plurality of slave nodes 108 may be configured to continuously or periodically collect the data from the plurality of end-user devices 106, which may include sensor readings, user inputs, operational status, or other relevant information. For example, the slave node 108A may be configured to continuously or periodically collect the data from the end-user device 106A, 106B, and 106C. Similarly, the slave node 108B may be configured to continuously or periodically collect the data from the end-user device 106D. Thereafter, one or more slave nodes from the plurality of slave nodes 108 may be configured to pre-process the collected data. In an example, the collected data may undergo pre-processing, including filtration, compression, encryption, or aggregation. In an example, the pre-processing may be used to remove redundant data, structure raw data, or perform initial computations to reduce the load on higher-level nodes. In an example, the one or more slave nodes from the plurality of slave nodes 108 may further receive control signals or commands from the plurality of local master nodes 110 to enable bidirectional communication. Furthermore, once the data is preprocessed, then the one or more slave nodes may be configured to transmit the processed and refined data to the plurality of local master nodes 110. The plurality of local master nodes 110 may be configured to further process the received data and then re-route the data to the plurality of regional master nodes 112, which may be configured to manage inter-regional routing to handle traffic from corresponding regional area.

In accordance with an embodiment, the hierarchical communication network 104 may implement a role definition and network establishment process wherein node classification and hierarchical positioning may be determined by a centralized control mechanism within the global master node 114. The global master node 114 may be configured to analyze multiple operational parameters of each network node including, but not limited to, mobility classification values, computational resources, geographical coordinates, signal-to-noise ratios of established links, available power sources, and antenna array configurations. The global master node 114 may initially self-designate itself as the global master node 114 based on predetermined optimal operational characteristics. Thereafter, the global master node 114 may identify and configure the regional master nodes 112A, 112B, 112C, . . . , 112N according to spatial distribution to maximize network coverage while maintaining robust backhaul connectivity. Subsequently, the global master node 114 may be configured to identify and designate local master nodes 110A, 110B, 110C, 110D, . . . , 110N strategically positioned to manage defined geographical clusters of end-user devices 106A-106N with slave nodes 108A-108N configured for end-user connectivity. The established hierarchy may be dynamically maintained through a continuous monitoring system wherein the global master node 114 may issue reconfiguration commands to reassign hierarchical roles as operational conditions change. The reassignments may be executed through a transitional protocol designed to preserve network integrity during reconfiguration events. For example, if a local master node 110C experiences degraded connectivity while a nearby slave node 108F shows improved signal quality, the global master node 114 may initiate a reconfiguration sequence. The global master node 114 may then establish an alternate communication path through an adjacent local master node 110D. The global master node 114 may further transmits role-reassignment instructions to both affected nodes. The slave node 108F may receive upgraded parameters to function as a new local master node, including beam steering settings and routing tables. Meanwhile, the degraded local master node 110C may receive instructions to transition to slave node functionality. During transition, both nodes may temporarily operate in dual modes to maintain uninterrupted service while the network hierarchy adapts.

In accordance with an embodiment, after the hierarchy establishment and dynamic maintenance, the hierarchical communication network 104 may initiate an operational mode where the global master node 114 may be configured to test and optimize data routing paths throughout the hierarchical communication network 104 based on mobility handling parameters associated with each hierarchical level. The hierarchical communication network 104 may implement a mobility-based configuration that may establish a strategic correlation between hierarchical level and mobility capabilities. Specifically, the slave nodes 108A-108N at the first level of hierarchy 116 may be configured to handle highest mobility support, the local master nodes 110A-110N at the second level of hierarchy 118 may support medium mobility, the regional master nodes 112A-112N at the third level of hierarchy 120 may have limited mobility, and the global master node 114 at the fourth level of hierarchy 122 may have minimal or no mobility. This mobility differentiation enables utilization of different packet lengths for data communication at each level, with the slave nodes 108A-108N employing shorter packets during high-velocity scenarios to maintain connection integrity despite Doppler effects and channel variations, while higher-level nodes utilize progressively larger packets for improved throughput. Concurrently, the dual-polarized phased array antennas at each node may dynamically adjust beam steering directions and polarization configurations based on link quality metrics to optimize wireless communication across all hierarchical levels.

In accordance with an embodiment, advanced interference and congestion management may be implemented in the hierarchical communication network 104. Specifically, the slave nodes 108A-108N at the first level of hierarchy 116 may acquire telemetry information from the end-user devices 106A-106N regarding signal quality and interference patterns. The local master nodes 110A-110N at the second level of hierarchy 118 may process telemetry information and detect local interference and congestion events within their operational domains. The local master nodes 110A-110N may calibrate radio frequency (RF) parameters including a transmit power, a transmit frequency, or a beam orientation based on the detected local interference and congestion event to mitigate localized issues. First, the local master nodes 110A-110N may dynamically adjust transmit power levels, potentially increasing power to overcome interference or reducing power to minimize co-channel interference in congested scenarios. Secondly, the local master nodes 110A-110N may shift transmit frequency within available bands, selecting clearer channels based on real-time spectrum analysis. Thirdly, the local master nodes 110A-110N may reconfigure beam orientations of its phased array antennas, creating signal nulls toward interference sources while enhancing gain in directions requiring improved coverage. For example, when local master node 110C detects pulsed interference from a specific direction, it may immediately adjust its beam pattern to create a 30 dB null toward the interference source while maintaining connectivity with slave nodes in other directions, simultaneously shifting operating frequency by 50 MHz to a cleaner portion of the spectrum, thereby preserving network performance despite adverse RF conditions. Concurrently, the regional master nodes 112A-112N at the third level of hierarchy 120 may coordinate cross-domain interference management when issues span multiple local master domains. The global master node 114 at the fourth level of hierarchy 122 may analyze network-wide telemetry to determine optimal beam steering directions and polarization configurations for each wireless link based on current network topology and link conditions. The multi-level approach to interference management may enable the hierarchical communication network 104 to maintain robust connectivity even in challenging RF environments.

In accordance with an embodiment, multi-band operation and polarization adaptation may be implemented to enhance communication reliability and throughput in the hierarchical communication network 104. The global master node 114 may establish dual radio access networks in an analog data plane among the plurality of network nodes 102. The first radio access network may operate using a first frequency spectrum that may include licensed or unlicensed mmWave frequencies in the 10-300 GHz range, while the second radio access network may operate using a lower frequency spectrum such as WLAN (Wi-Fi® or ISM bands). The plurality of network nodes 102 may be configured to concurrently operate in these multiple frequency bands, dynamically selecting optimal frequencies based on communication requirements and environmental conditions. Additionally, the slave nodes 108A-108N and the local master nodes 110A-110N may utilize their dual-polarized phased array antennas to operate concurrently in multiple polarization types, automatically switching between polarization configurations when an end-user device's orientation or velocity changes. This adaptive polarization capability ensures that node-level signal reception remains above a defined threshold despite dynamic mobility conditions, providing superior connectivity compared to traditional single-polarization systems. In an example, high-speed mobile nodes may utilize the lower frequency network to maintain connectivity over greater distances, while stationary nodes may leverage the mmWave spectrum for maximum throughput.

In accordance with an embodiment, adaptive packet length management may be implemented in the hierarchical communication network 104 based on mobility conditions. The plurality of network nodes 102 may utilize different packet lengths for data communication across each level of hierarchy based on the mobility handling parameters established during configuration. Specifically, when the end-user devices 106A-106N move rapidly above a defined speed limit, the slave nodes 108A-108N at the first level of hierarchy 116 may automatically reduce packet length below a defined threshold to minimize the influence of channel variations and packet errors caused by Doppler shifts and rapid fading. Conversely, when the end-user devices 106A-106N are stationary or moving slowly below the defined speed limit, the plurality of network nodes 102 may increase packet length above the defined threshold to maximize data throughput by reducing header overhead. This dynamic adjustment occurs autonomously based on real-time mobility measurements, with higher hierarchical levels (e.g., the fourth level of hierarchy 122 and the third level of hierarchy 120) may maintain larger packet sizes for backhaul efficiency while lower hierarchical levels (e.g., the first level of hierarchy 116 and the second level of hierarchy 118) may adapt packet characteristics to mobility conditions. This mobility-responsive packet management significantly improves communication reliability in dynamic environments while optimizing bandwidth utilization throughout the hierarchical communication network 104.

In accordance with an embodiment, some nodes of the plurality of network nodes 102 may be assigned to the role of an analog repeater to extend network coverage and enhance signal propagation or new analog repeaters may be deployed. The analog repeater may be assigned to key positions where signal degradation occurs due to distance or obstacles. These analog repeaters may capture existing signals from transmitting sources, amplify them without decoding, and retransmit them to extend the network's effective range. The analog repeaters may synchronize with the network through frequency and phase alignment to maintain network integrity. Each analog repeater may implement spatial filtering capabilities through directional antennas to reduce interference from external sources. For mobile scenarios, portable analog repeaters may be used, which may be equipped with Doppler shift compensation mechanisms that inject pilot tones to track and correct frequency offsets caused by high-velocity movement. The analog repeaters may enable the Wi-Fi® 7 capabilities to function effectively even in high-mobility environments where conventional systems would experience significant performance degradation. The global master node 114 may coordinate repeater placement and configuration to optimize coverage while minimizing self-interference within the hierarchical communication network 104.

In accordance with an embodiment, the global master node 114 may be further configured to activate a distributed intelligence operation in the hierarchical communication network 104 for real-time mobility-based optimization across different hierarchical levels. Beneficially, the global master node 114 may be further configured to apply distinct optimization operations for each hierarchical level based on the expected mobility handling parameters of nodes at that level (i.e., hierarchy-specific mobility parameters) unlike applying uniform predictive models across all nodes in conventional systems. For example, the slave nodes 108A-108N may utilize the optimization operation specifically calibrated for high-mobility scenarios including rapid beam switching and short packet lengths, while the local master nodes 110A-110N may employ medium-mobility optimization operations featuring adaptive polling rates and predictive handoff calculations. Similarly, the regional master nodes 112A-112N may implement limited-mobility optimization with emphasis on load balancing and congestion prevention, whereas the global master node 114 may execute minimal-mobility optimization focusing on long-term network efficiency and resource allocation. This hierarchical differentiation of optimization operations may enable the network to concurrently apply mobility-appropriate operations at each level rather than applying a single optimization approach across the entire network regardless of mobility differences.

In an example, when a vehicle equipped with the slave node 108C moves at speeds exceeding a predetermined threshold, the slave node 108C may automatically activate Doppler-shift compensation through pilot tone injection. The dual-polarized antennas of the slave node 108C may inject pilot tones on opposite polarizations, wherein a positive pilot tone may be transmitted on vertical polarization and a negative pilot tone may be transmitted on horizontal polarization. This configuration may enable the communication system 100B to isolate and track frequency shifts caused by movement, thereafter, compensating for the shifts before signal degradation occurs. In aircraft applications, the slave nodes 108F-108H may maintain connectivity by adjusting carrier frequency offsets based on real-time Doppler measurements.

In another example, the local master nodes 110A-110N may coordinate cross-domain handoffs using a soft boundary handover operation. For example, when the end-user device 106D approaches a boundary between domains controlled by the local master nodes 110B and 110C, both the local master nodes 110B and 110C may concurrently serve the end-user device 106D. This may be achieved by synchronizing transmission timing and data streams between the local master nodes 110B and 110C, allowing seamless transition as the end-user device 106D traverses domain boundaries.

In yet another example, the regional master nodes 112A-112N may execute domain-based resource allocation that dynamically reshapes coverage boundaries based on mobility patterns. For example, if the telemetry information indicates concentrated movement toward a specific area, the regional master node 112B may automatically expand the coverage responsibility of certain local master nodes in that direction while contracting coverage in less active areas.

In yet another example, the global master node 114 may implement hierarchy-aware beam pattern coordination where beam characteristics may be collectively optimized across mobility tiers. For example, when aerial vehicles (as end-user devices) connected to the slave nodes 108D-108F operate above ground vehicles connected to slave nodes 108A-108C, the global master node 114 may coordinate beam patterns from all hierarchical levels to create complementary coverage patterns that maximize connectivity across diverse mobility scenarios.

In accordance with an embodiment, the global master node 114 may be configured to implement advanced security protocols adapted to the hierarchical mobility framework in the hierarchical communication network 104. The security implementation may be mobility-aware, where each hierarchical level may employ security mechanisms specifically suited to its mobility characteristics. For example, the slave nodes 108A-108N may implement lightweight encryption protocols with rapid key refresh rates suitable for high-mobility scenarios, ensuring security without imposing computational burdens that could impact real-time performance. The local master nodes 110A-110N may manage security domain boundaries, where cryptographic contexts are pre-distributed to adjacent local master nodes before a mobile device crosses domain boundaries, thereby maintaining security during handoff processes without authentication delays. The regional master nodes 112A-112N may implement cross-domain security coordination, managing authentication credentials across multiple local domains while monitoring for potential security anomalies that might indicate jamming attempts or unauthorized access. The global master node 114 may maintain the security policy framework for the entire network, dynamically adjusting security parameters based on threat assessments while ensuring that security overhead remains appropriate to the mobility characteristics and processing capabilities of each hierarchical level.

In accordance with an embodiment, the global master node 114 may be further configured to coordinate network-wide beam management where each node's dual-polarized phased array antennas may be configured to create an optimal beam pattern based on current network conditions. For example, the slave nodes 108A-108N may implement rapid beam switching capabilities, where beam direction may be altered within microseconds to track the end-user devices 106A-106N that may be highly mobile. The local master nodes 110A-110N may employ beam nulling techniques to minimize interference, where antenna phase and amplitude settings are adjusted to create signal nulls in the direction of known interference sources. When jamming signals are detected, the regional master nodes 112A-112N may coordinate distributed nulling operations across multiple domains, where nodes may collectively adjust their beam patterns to create stronger nulls toward jamming sources while maintaining connectivity among legitimate network devices. For military applications, the hierarchical communication network 104 may implement tactical beam deception, where certain nodes transmit decoy beams to confuse adversary direction-finding equipment while maintaining actual communication links through alternate beam patterns, thereby enhancing communication security in contested environments.

Figure 2:
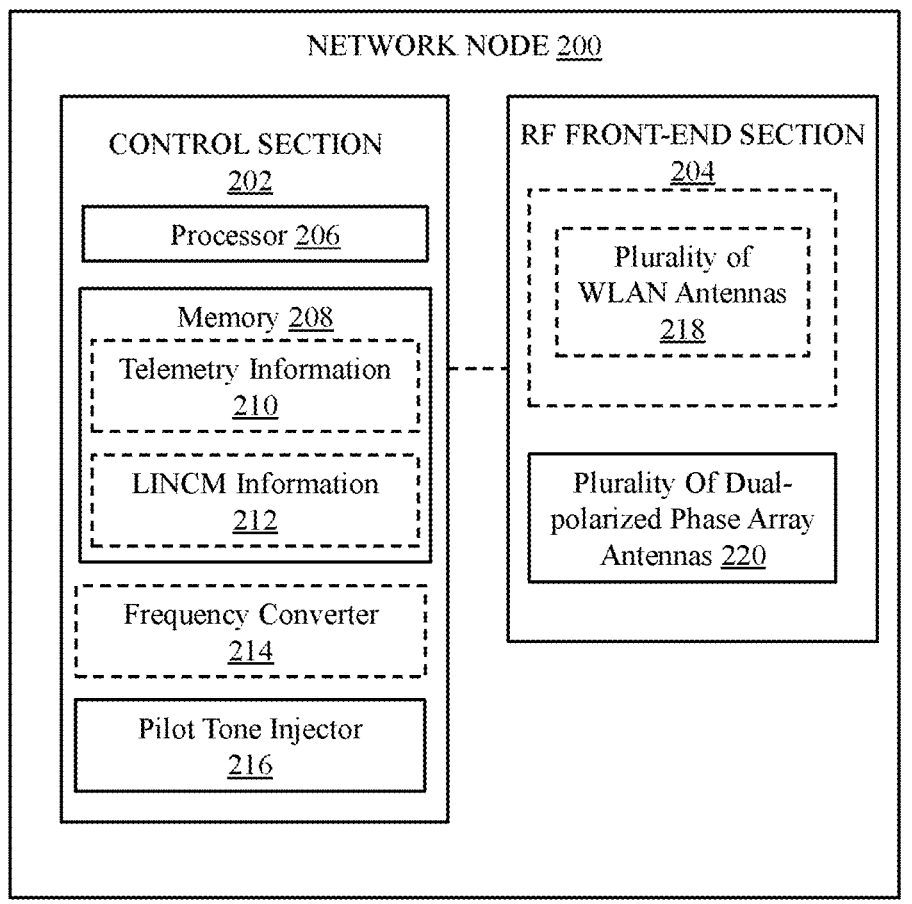
FIG. 2 is a block diagram that illustrates various components of an exemplary network node of a communication system, in accordance with an embodiment of the disclosure.

FIG. 2 is a block diagram that illustrates various components of an exemplary network node of a communication system, in accordance with an embodiment of the disclosure. FIG. 2 is explained in conjunction with elements from FIGS. 1A and 1B. With reference to FIG. 2, there is shown a block diagram of a network node 200. In an implementation, the network node 200 may be a slave node of the plurality of slave nodes 108, a local master node of the plurality of local master nodes 110, or a regional master node of the plurality of regional master nodes 112 (except the global master node 114).

In this exemplary embodiment, the network node 200 may include control section 202 and a RF front-end section 204. The control section 202 may include a processor 206 and a memory 208, which may include telemetry information 210 and local inter-node connections mappings (LINCM) information 212. In an implementation, the control section 202 may further include a frequency converter 214 and a pilot tone injector 216. Network node 200 may be modified to further include high-gain dual polarized antennas, such as a plurality of dual-polarized phase array antennas 220. In some implementations, the RF front-end section 204 may include a plurality of WLAN antennas 218. The processor 206 may be communicatively coupled to the memory 208, the frequency converter 214 (when provided), and the different components of the RF front-end section 204 of the network node 200.

The processor 206 may be configured to determine geolocation of the neighboring network nodes to establish wireless links. In accordance with an embodiment, the network node 200 may further comprise a position sensor (e.g., a gyroscope) or a location sensor (e.g., a global positioning system (GPS) sensor or other geospatial location sensors). Alternatively, the processor 206 may be configured to determine corresponding location coordinates or location coordinates of neighboring nodes (e.g., nearby mesh nodes) by the received signal strength indication (RSSI)-based triangulation or WI-FI®-based triangulation process. Examples of the processor 206 may include but are not limited to a central processing unit (CPU), a graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The memory 208 may include suitable logic, circuitry, and/or interfaces that may be configured to store instructions executable by the processor 206. Examples of implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read-only memory (ROM), a hard disk drive (HDD), a secure digital (SD) card, a flash drive, cache memory, and/or other non-volatile memory.

The memory 208 may include the telemetry information 210 and the LINCM information 212. The telemetry information 210 may comprise a unique identifier (ID) and geo-location of the network node 200 and nearby network nodes, an operational state of the network node 200, and the signal metadata of WLAN signals or mmWave signals communicated by the network node 200. The telemetry information 210 may be useful to enable the hierarchical mobility-based optimization capabilities of the hierarchical communication network 104. The unique identifier (ID) and geo-location data of network node 200 and nearby nodes may be utilized by the global master node 114 to construct accurate network topology maps and determine spatial relationships that may be used for beam steering decisions and domain boundary definitions. The operational state information may be analyzed to assess available resources, processing capabilities, and current loading of each node, enabling the ANN model 312 (FIG. 3) to make informed routing decisions that distribute network traffic according to node capacity within each hierarchy level. The signal metadata of WLAN signals or mmWave signals may provide essential link quality metrics including signal-to-noise ratios, interference levels, and packet error rates that inform adaptive modulation and coding decisions appropriate to each node's mobility classification. Furthermore, the telemetry information 210 may enable the system to detect mobility-related performance degradation, such as Doppler-induced frequency shifts, triggering the deployment of appropriate compensation mechanisms including pilot tone injection at specific network points. The continuous collection and analysis of this telemetry data across all hierarchy levels may allow the global master node 114 to implement its dynamic role reassignment capabilities, where nodes may be promoted or demoted within the hierarchy based on real-time assessment of their changing positions, connectivity quality, and operational characteristics.

The Local Inter-Node Connections Mappings (LINCM) information 212 at the individual network node level may comprise a localized view of network connectivity relevant to that node's operational domain. For example, in each of the plurality of slave nodes 108, the LINCM information 212 may include data regarding available connection paths to the plurality of local master nodes 110, including signal quality metrics and estimated reliability of each path. For the plurality of local master nodes 110, the LINCM information 212 may include connectivity details to corresponding slave nodes beneath them and the regional master nodes above them, enabling localized routing optimizations within their domain of control. The plurality of regional master nodes 112 may maintain broader LINCM information 212 encompassing cross-domain connection possibilities, facilitating load balancing and redundancy planning across multiple local domains. Each node may continuously update its LINCM information 212 based on real-time measurements and receive periodic updates from adjacent nodes, creating a distributed awareness of network topology that supports autonomous decision-making when the global master node 114 is unreachable or during rapidly changing mobility scenarios requiring immediate local adaptations.

The frequency converter 214 (when present) may be used to up convert or down convert frequencies. The frequency converter 214 may down-convert received signals using reference frequencies derived from the detected pilot tones, effectively removing Doppler-induced frequency shifts before up-converting the signal back to its original band for retransmission with corrected frequency. In multi-band operations, the frequency converter 214 may facilitate seamless transitions between different frequency bands (such as mmWave and WLAN/ISM) based on changing mobility requirements and environmental conditions, allowing nodes to maintain optimal connectivity regardless of their movement speed. The frequency converter 214 may also support the system's interference mitigation capabilities by enabling frequency-selective processing that can isolate and convert desired signals while filtering unwanted interference, thereby maintaining communication integrity in contested spectrum environments across all hierarchy levels of the network.

The pilot tone injector 216 may be used by the network node 200 to implement routing optimization through pilot tone injection through injection of known reference signals across the hierarchical communication network 104. In an example, the pilot tone injector 216 may provide calibration references that allow the network node 200 to measure channel characteristics of the hierarchical communication network 104. In addition, in the hierarchical communication network 104, the network node 200 may coordinate the transmission of the pilot tone injection across different frequency bands.

The plurality of WLAN antennas 218 may provide complementary communications capabilities to the hierarchical communication network 104, operating alongside the dual-polarized phased array antennas 220 to enhance system resilience and range. The plurality of WLAN antennas 218 may enable each network node to establish and maintain connectivity through the WLAN frequencies (typically 2.4 GHz, 5 GHZ, 6 GHZ, or 7 GHz bands) as part of the dual radio access network implementation. In mobility scenarios where mmWave connections through the phased array antennas experience limitations due to range or obstacles, the plurality of WLAN antennas 218 may provide fallback connectivity with greater penetration and coverage capabilities, although at lower data rates. This multi-band capability may be valuable for maintaining minimal connectivity with high-mobility nodes that temporarily move beyond the effective range of mmWave communications, ensuring continuous network presence even when optimal high-bandwidth links may not be maintained.

The plurality of dual-polarized phase array antennas 220 may be configured to perform directional wireless communication. The plurality of dual-polarized phase array antennas 220 may be configured to capture and relay a wide range of frequency spectrum, such as 50 hertz to 300 GHz to one or more nearby nodes. The plurality of dual-polarized phased array antennas 220 when arranged in a circular configuration, may provide complete 360-degree coverage while maintaining narrow beam directionality, allowing nodes to communicate concurrently in multiple directions without physical rotation. The dual-polarization capability may enable the network node 200 to transmit and receive signals on orthogonal polarization planes, effectively doubling channel capacity while providing inherent resistance to interference and jamming. During high-mobility scenarios, the plurality of dual-polarized phase array antennas 220 may support beam switching rather than continuous steering, where the network node 200 may rapidly select the optimal antenna element based on relative positions rather than attempting to continuously adjust phase relationships. The dual-polarized configuration may further enable the pilot tone injection technique, wherein pilot tones with opposite polarity are transmitted on vertical and horizontal polarizations respectively, allowing for isolation and tracking of frequency shifts caused by movement. In interference mitigation operations, the plurality of dual-polarized phase array antennas 220 may implement nulling operation by adjusting phase and amplitude settings to create signal nulls in the direction of known interference sources while maintaining connectivity in other directions. The network node 200 may be further configured to utilize the plurality of dual-polarized phase array antennas 220 to wirelessly establish the communication with two or more nearby network nodes in the hierarchical communication network 104.

Figure 3:
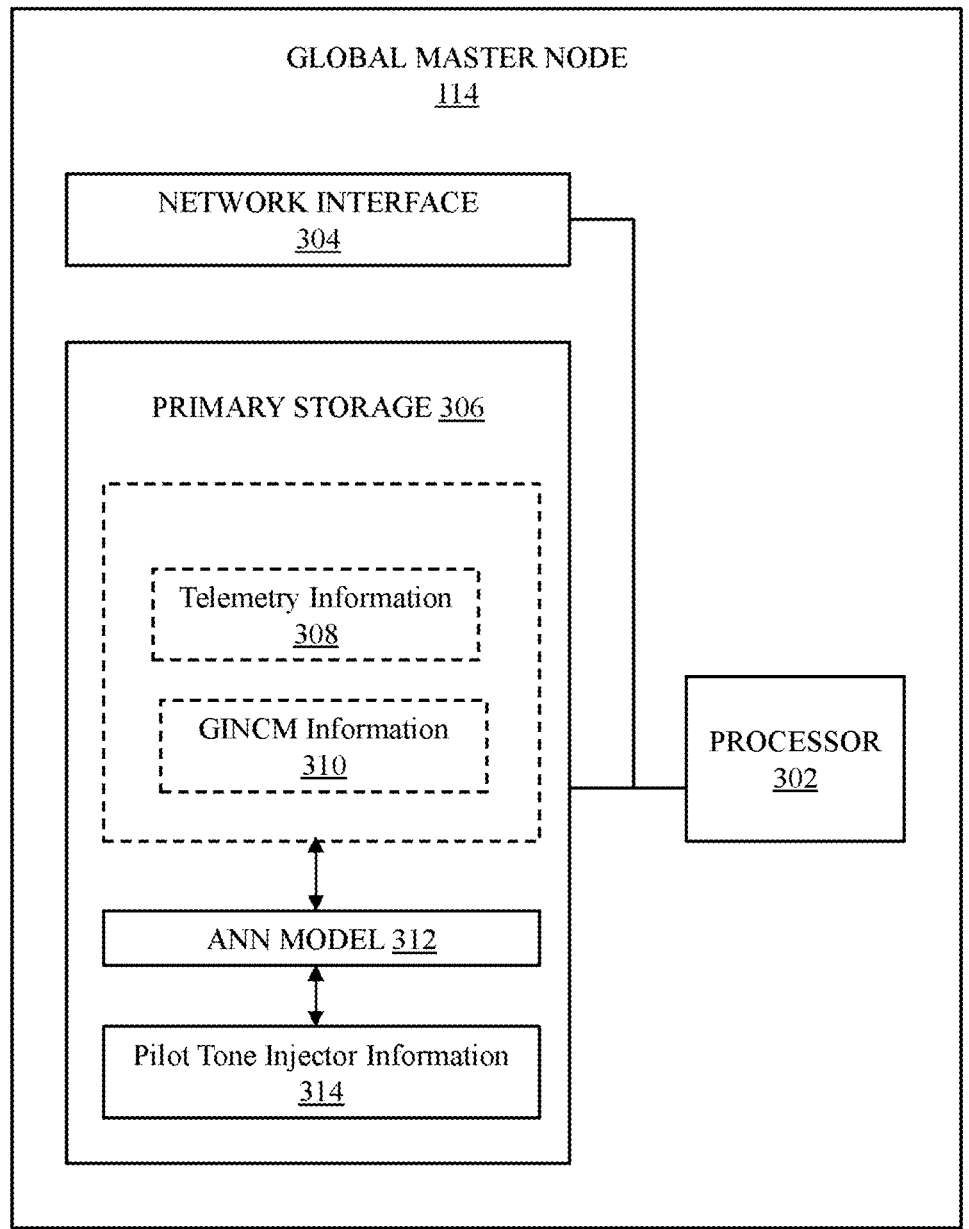
FIG. 3 is a block diagram that illustrates various components of an exemplary global master node of a communication system, in accordance with an embodiment of the disclosure.

FIG. 3 is a block diagram that illustrates various components of an exemplary global master node of a communication system, in accordance with an exemplary embodiment of the disclosure. FIG. 3 is explained in conjunction with elements from FIGS. 1A, 1B, and 2. With reference to FIG. 3, there is shown a block diagram of the global master node 114. The global master node 114 may include a processor 302, a network interface 304, and a primary storage 306. The primary storage 306 may include telemetry information 308, Global Inter-Node Connections Mappings (GINCM) information 310, an artificial neural network (ANN) model 312, and pilot tone injector information 314.

The processor 302 may be configured to perform various operations of the global master node 114 (described, for example, in FIGS. 1A and 1B). The processor 302 may be further configured to cause each network node to determine location information of a plurality of neighboring nodes around each network node. Each network node may determine its geo-location and the geo-location of the neighboring nodes. Examples of the processor 302 may include but are not limited to a central processing unit (CPU), graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The network interface 304 may include suitable logic, circuitry, and/or interfaces that may be used by the global master node 114 to establish communication with the plurality of regional master nodes 112.

The primary storage 306 may be cloud-based storage that may integrate the mobility-based hierarchy to optimize data management. The primary storage 306 may dynamically adjust caching strategies and data synchronization based on the mobility classification of the requesting node. For example, for the plurality of slave nodes 108 in high-mobility environments, the global master node 114 may implement aggressive pre-fetching of data along predicted movement paths and may establish temporary edge cache nearby the plurality of local master nodes 110A. When less mobile regional master nodes, such as the plurality of regional master nodes 112, may access the same data, the global master node 114 may employ bandwidth-optimized synchronization protocols with reduced overhead. The primary storage 306 may further implement mobility-aware data partitioning where mission-critical information may be dynamically redistributed to follow mobile units, maintaining local accessibility despite changing physical positions. This integration between cloud storage functions and mobility hierarchy significantly improves data access performance across diverse mobility scenarios.

The telemetry information 308 may be received from the received from the plurality of regional master nodes 112 or the plurality of network nodes 102. Based on the telemetry information 308, the global master node 114 may be configured to determine how each different types of network node may connect, forming a mesh, daisy-chain, or even a custom hybrid of both while maintaining the hierarchy in the hierarchical communication network 104. This provides enhanced resilience, where even unforeseen failures in one part of the network may be bypassed by using alternative paths. Furthermore, dynamically forming the hierarchical communication network 104 based on telemetry information 308 enables the communication system 100A or 100B to implement advanced collision management techniques, such as optimized path selection, real-time collision avoidance, adaptive channel allocation, fault tolerance, and continuous optimization. These capabilities help minimize collisions, improve network efficiency, and enhance reliability and performance. For example, the global master node 114 may be configured to analyze the telemetry information 308 to dynamically select one or more data propagation paths (i.e., optimal data paths) from amongst a plurality of available data propagation paths for data transmission. By considering factors, such as signal strength, interference levels, and network traffic, the global master node 114 may be configured to route data along data propagation paths that minimize the risk of collisions and maximize overall network performance.

The GINCM information 310 may be generated by the global master node 114. The global master node 114 may be configured to generate the GINCM information 310 for the plurality of network nodes 102 based on the telemetry information 308 received from the plurality of regional master nodes 112 directly or the plurality of network nodes 102. The individual network nodes may collect and send telemetry information 308 to the global master node 114 periodically or on demand. The telemetry information 308 may include details about the node's currently active connections to neighbors, signal strengths, load levels, geographic locations, etc. The global master node 114 may process the telemetry information 308 from across the hierarchical communication network 104. Based on analysis of the telemetry information 308, the global master node 114 may generate the GINCM information 310 that represents the current ideal interconnection topology for efficient routing across the entire hierarchical communication network 104. A portion of the GINCM information 310 may then be disseminated back to the individual network nodes (for example, as LINCM information 212), such as the plurality of regional master nodes 112, the plurality of local master nodes 110, and the plurality of slave nodes 108, to update their routing/forwarding decisions. This is useful because while each network node may have a localized view of neighboring node, the global master node 114 may construct a global internode connectivity map for the entire hierarchical communication network 104 using the aggregated telemetry information 308. Further, as network conditions change (new nodes added, wireless environment changes, loads shift etc.), the GINCM information 310 may be periodically updated to provide an optimized routing configuration. Thus, pushing a portion of the centrally calculated GINCM information 310 to all network nodes ensures a consistent routing configuration across the hierarchical communication network 104. The data plane (nodes forwarding traffic) may be separated from the control plane logic in the global master node 114 for calculating the optimal mappings. This improves overall network performance, reliability and adaptability compared to fully distributed approaches.

The ANN model 312 may correspond to a neural network that may be used by the global master node 114 to adjust data routing paths throughout the hierarchical communication network 104 based on a mobility handling parameter associated with each level of hierarchy in the hierarchical communication network 104. The ANN model 312 may utilize the telemetry information 308, the GINCM information 310, and the pilot tone injector information 314, the ANN model 312 may output instructions to adjust data routing paths throughout the hierarchical communication network 104.

The pilot tone injector information 314 may be received from the plurality of regional master nodes 112. The pilot tone injector information 314 may correspond to one or more parameters related to insertion of reference signals (i.e., pilot tones) into a communication channel. In other words, the pilot tone injector information 314 may comprise specialized data related to the Doppler shift compensation mechanism implemented within the hierarchical communication network 104. Specifically, the pilot tone injector information 314 may include the injection parameters of dual-polarized pilot tones transmitted on opposite polarizations of the dual-polarized phased array antennas 220 for frequency offset tracking and correction. The pilot tone injector information 314 may contain real-time measurements of frequency shifts detected across the network hierarchy, with particular emphasis on high-mobility slave nodes, such as the plurality of slave nodes 108 (e.g. portable repeaters deployed in vehicles or aircraft). The pilot tone injector information 314 may further include the correlation between measured Doppler shifts and the velocity vectors of mobile nodes, enabling the ANN model 312 to predict required frequency compensations based on mobility trajectories. Additionally, the pilot tone injector information 314 may incorporate data regarding the effectiveness of current compensation techniques across various mobility scenarios, including signal quality metrics before and after frequency correction, thereby providing essential feedback for optimizing the pilot tone injection parameters and positioning of portable repeaters that implement Doppler shift compensation throughout the hierarchical communication network 104.

In accordance with an embodiment, the training of the ANN model 312 may follow a practical hybrid approach combining supervised initialization with deep reinforcement learning. The training process may begin with the collection of operational network data across all hierarchy levels during controlled field tests, where various mobility scenarios may be systematically executed and outcomes recorded. These initial datasets may include measured throughput, latency, packet delivery ratios, and energy consumption metrics paired with the network conditions and routing decisions that produced them. The training implementation may start with supervised learning using field-collected datasets to establish baseline routing intelligence. The global master node 114 may then transition to a deep reinforcement learning framework wherein the ANN model 312 may interact directly with the live network environment. During operation, the ANN model 312 may select routing configurations and receive performance feedback through measured network metrics. The global master node 114 may assign positive rewards when routing decisions improve network performance metrics for given mobility conditions, while negative rewards may penalize decisions that degrade performance. This approach may allow the ANN model 312 to learn directly from real-world network behaviors rather than simulated environments.

In accordance with an embodiment, the ANN model 312 may employ transfer learning techniques to accelerate training for new deployment environments. When the ANN model 312 may be installed in a new operational area, the pre-trained model weights from previous deployments may serve as initialization points, requiring only fine-tuning to adapt to the specific characteristics of the new environment. In an example, the ANN model 312 training may be initialized with a hierarchical graph neural network (HGNN) architecture specifically designed to scale and handle thousands of mobile nodes. The architecture may comprise a multi-level attention mechanism that may hierarchically process network information, where node-level features may be first processed through local graph convolutional layers with shared weights, then aggregated at cluster levels corresponding to the network hierarchy in the hierarchical communication network 104. In an example, the hyperparameters may include an adaptive learning rate starting at 0.0005 with layer-specific learning rate multipliers, distributed batch processing across computing resources with an effective batch size of 1024 samples, and a specialized Adam optimizer with gradient clipping at a threshold of 5.0. The reinforcement learning component may implement a distributed Proximal Policy Optimization (PPO) algorithm with a parallelized experience collection across multiple network segments, using a hierarchical replay buffer structure that maintains 50,000 samples per hierarchy level and importance sampling to prioritize rare but highly prioritized routing events. The ANN model 312 may employ a custom loss function combining temporal difference learning with a hierarchical attention penalty to focus computational resources on actively mobile segments of the hierarchical communication network 104. To handle scale efficiently, the global master node 114 may implement a dynamic node clustering algorithm that groups topologically related nodes, enabling the model to process thousands of nodes by operating on cluster representations rather than individual nodes, with abstraction levels that mirror the physical network hierarchy of the hierarchical communication network 104.

Once deployed, the ANN model 312 may operate in inference mode where it may continuously or periodically process real-time inputs from the telemetry information 308, GINCM information 310, and pilot tone injector information 314. For each inference cycle, the ANN model 312 may first processes mobility handling parameters from each hierarchical level, identifying the unique mobility characteristics of the plurality of slave nodes 108 (e.g., the slave nodes 108A-108N), the plurality of local master nodes 110 (e.g., the local master nodes 110A-110N), and the plurality of regional master nodes 112 (e.g., the regional master nodes 112A-112N). The ANN model 312 may then correlate these mobility parameters with current signal quality metrics and interference data to predict optimal routing paths. The ANN's neural architecture, featuring specialized layers for processing mobility data, enables it to recognize patterns in network behavior that would be difficult to address with traditional routing algorithms.

In accordance with an embodiment, the inference output from the ANN model 312 may generate specific routing adjustment instructions tailored to each hierarchical level. For example, for the high-mobility slave nodes, such as the plurality of slave nodes 108, the ANN model 312 may recommend frequent path updates and redundant routing to maintain connectivity during rapid movement. For the plurality of local master nodes 110, the output may focus on load balancing and handoff coordination between adjacent domains. At the plurality of regional master nodes 112, the ANN model 312 may produce instructions for cross-domain traffic optimization and congestion prevention. The global master node 114 may implement these routing instructions through configuration commands sent to appropriate nodes of the plurality of network nodes 102 either directly or via the plurality of regional master nodes 112, creating a continuously optimized network topology that adapts in real-time to changing mobility conditions, interference patterns, and traffic demands across the entire hierarchical communication network 104.

FIG. 4 is a flowchart of a method of wireless communication in a hierarchical communication network, in accordance with an embodiment of the disclosure. FIG. 4 is explained in conjunction with elements from FIGS. 1A, 1B, 2, and 3. With reference to FIG. 4, there is shown a flowchart of a method 400 comprising exemplary operations 402 through 416. The method 400 may be implemented in the communication system 100A or 100B.

At 402, the plurality of slave nodes 108 at the first level of hierarchy 116 in the hierarchical communication network 104 may establish communication with the plurality of local master nodes 110 and the plurality of end-user devices 106.

At 404, the plurality of local master nodes 110 at the second level of hierarchy 118 in the hierarchical communication network 104 may establish communication with the plurality of regional master nodes 112.

At 406, the plurality of regional master nodes 112 at the third level of hierarchy 120 in the hierarchical communication network 104 may establish communication with the global master node 114.

At 408, the global master node 114 at the fourth level of hierarchy 122 in the hierarchical communication network 104 may adjust data routing paths throughout the hierarchical communication network 104 based on a mobility handling parameter associated with each level of hierarchies in the hierarchical communication network 104. Each level of hierarchy in the hierarchical communication network 104 may be associated with a different mobility range to support one or more mobility operations of the plurality of end-user devices 106. The first level of hierarchy 116, the second level of hierarchy 118, and the third level of hierarchy 120 in the hierarchical communication network 104 may have a first mobility range, a second mobility range and a third mobility range respectively. Moreover, the first mobility range associated with the first level of hierarchy 116 may be higher than the second mobility range associated with the second level of hierarchy 118, and the second mobility range associated with the second level of hierarchy 118 may be higher than the third mobility range associated with the third level of hierarchy 120.

At 410, the plurality of network nodes 102 in the hierarchical communication network 104 may be concurrently operate in a plurality of frequency bands and in a plurality of polarization types.

At 412, the plurality of network nodes 102 may switch between the plurality of polarization types when an orientation or a velocity of an end-user device to which a corresponding network node is connected is changed to maintain a node-level signal reception greater than a defined threshold.

At 414, the plurality of network nodes 102 may utilize different packet lengths for data communication for each level of hierarchy based on the mobility handling parameter associated with each level of hierarchy in the hierarchical communication network 104.

At 416, the global master node 114 may determine a beam steering direction and a polarization configuration for each wireless link in the hierarchical communication network 104 based on a network topology and a link condition parameter associated with each wireless link.

Various embodiments of the disclosure may provide the communication system 100A or 100B (FIGS. 1A and 1B). The communication system 100A or 100B may include the plurality of network nodes 102 that may be interconnected in the hierarchical communication network 104. The plurality of network nodes 102 may comprise the plurality of slave nodes 108 at a first level of hierarchy 116 in the hierarchical communication network 104 configured to establish communication with the plurality of local master nodes 110 and the plurality of end-user devices 106. The plurality of network nodes 102 may further comprise the plurality of local master nodes 110 at the second level of hierarchy 118 in the hierarchical communication network 104 configured to establish communication with the plurality of regional master nodes 112. The plurality of network nodes 102 may further comprise the plurality of regional master nodes at the third level of hierarchy 120 in the hierarchical communication network 104 configured to establish communication with the global master node 114. The global master node at the fourth level of hierarchy 122 in the hierarchical communication network 104 may be configured to adjust data routing paths throughout the hierarchical communication network 104 based on a mobility handling parameter associated with each level of hierarchy in the hierarchical communication network 104.

Various embodiments of the disclosure may provide a computer program product for wireless communication in the hierarchical communication network 104, the computer program product comprising a non-transitory computer-readable storage medium having program instructions embodied therewith, the program instructions are executable by a system to cause the system to execute operations, the operations comprising establishing, by the plurality of slave nodes 108 at the first level of hierarchy 116 in the hierarchical communication network 104, communication with the plurality of local master nodes 110 and the plurality of end-user devices 106. The operations may further include establishing, by the plurality of local master nodes 110 at the second level of hierarchy 118 in the hierarchical communication network 104, communication with the plurality of regional master nodes 112. The operations may further include establishing, by the plurality of regional master nodes 112 at the third level of hierarchy 120 in the hierarchical communication network, communication with the global master node. The operations may further include adjusting, by the global master node 114 at the fourth level of hierarchy 122 in the hierarchical communication network 104, data routing paths throughout the hierarchical communication network 104 based on a mobility handling parameter associated with each level of hierarchy in the hierarchical communication network 104.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A communication system, comprising:
a plurality of network nodes that is interconnected in a hierarchical communication network,
  wherein each network node of the plurality of network nodes is associated with a level of hierarchy of distinct levels of hierarchy in the hierarchical communication network,
  the plurality of network nodes comprises:
    a global master node configured to perform a continuous collection and analysis of network-wide telemetry information across the distinct levels of hierarchy to implement a dynamic reassignment of hierarchical roles of specific network nodes of the plurality of network nodes,
    the dynamic reassignment is based on at least one of:
      changing positions of the specific network nodes,
      connectivity quality of the specific network nodes, or
      operational characteristics of the specific network nodes,
    the specific network nodes include a first network node and a second network node,
    the first network node is a slave node of the plurality of network nodes,
    the first network node is configured to receive upgraded parameters to transition to a local master node of the plurality of network nodes,
    the upgraded parameters include beam steering settings and routing tables, and
    the second network node is a local master node of the plurality of network nodes and is configured to receive instructions to transition to a slave node of the plurality of network nodes.

2. The communication system according to claim 1, wherein the plurality of network nodes further comprises:
a plurality of slave nodes, at a first level of hierarchy of the distinct levels of hierarchy, configured to establish communication with a plurality of local master nodes and a plurality of end-user devices;
the plurality of local master nodes, at a second level of hierarchy of the distinct levels of hierarchy, configured to establish communication with a plurality of regional master nodes;
the plurality of regional master nodes, at a third level of hierarchy of the distinct levels of hierarchy, configured to establish communication with the global master node; and the global master node at a fourth level of hierarchy of the distinct levels of hierarchy.

3. The communication system according to claim 1, wherein the dynamic reassignment includes at least one of a promotion or a demotion of the specific network nodes within the distinct levels of hierarchy.

4. The communication system according to claim 1, wherein the global master node is further configured to transmit role-reassignment instructions during the dynamic reassignment to the specific network nodes.

5. The communication system according to claim 1, wherein the first network node shows an improved signal quality, and the second network node experiences degraded signal connectivity.

6. The communication system according to claim 1, wherein each of the specific network nodes is configured to temporarily operate in dual modes during the transition.

7. The communication system according to claim 1, wherein the network-wide telemetry information includes at least one of signal-to-noise ratios, packet error rates, retry counters, channel utilization metrics, and interference power measurements across multiple frequency bands.

8. A method of wireless communication in a hierarchical communication network, the method comprising:

interconnecting a plurality of network nodes in the hierarchical communication network, wherein each network node of the plurality of network nodes is associated with a level of hierarchy of distinct levels of hierarchy in the hierarchical communication network; and performing, by a global master node of the plurality of network nodes, a continuous collection and analysis of network-wide telemetry data across the distinct levels of hierarchy to implement a dynamic reassignment of hierarchical roles of specific network nodes of the plurality of network nodes, wherein the dynamic reassignment is based on at least one of:

changing positions of the specific network nodes, connectivity quality of the specific network nodes, or operational characteristics of the specific network nodes, the specific network nodes include a first network node and a second network node, the first network node is a slave node of the plurality of network nodes, the second network node is a local master node of the plurality of network nodes, and the method further comprises:

receiving, by the first network node, upgraded parameters to transition to a local master node of the plurality of network nodes; and receiving, by the second network node, instructions to transition to a slave node of the plurality of network nodes, wherein the upgraded parameters include beam steering settings and routing tables.

9. The method according to claim 8, wherein the plurality of network nodes further comprises:

a plurality of slave nodes, at a first level of hierarchy of the distinct levels of hierarchy, configured to establish communication with a plurality of local master nodes and a plurality of end-user devices;

the plurality of local master nodes, at a second level of hierarchy of the distinct levels of hierarchy, configured to establish communication with a plurality of regional master nodes;

the plurality of regional master nodes, at a third level of hierarchy of the distinct levels of hierarchy, configured to establish communication with the global master node; and the global master node at a fourth level of hierarchy of the distinct levels of hierarchy.

10. The method according to claim 8, wherein the dynamic reassignment includes at least one of a promotion or a demotion of the specific network nodes within the distinct levels of hierarchy.

11. The method according to claim 8, further comprising transmitting, by the global master node, role-reassignment instructions during the dynamic reassignment to the specific network nodes.

12. The method according to claim 8, wherein the first network node shows an improved signal quality, and the second network node experiences degraded signal connectivity.

13. The method according to claim 8, further comprising operating temporarily in dual modes by each of the specific network nodes during the transition.

14. A computer program product for wireless communication in a hierarchical communication network, the computer program product comprising a computer-readable storage medium having program instructions embodied therewith, the program instructions are executable by a system to cause the system to execute operations, the operations comprising:

interconnecting a plurality of network nodes in the hierarchical communication network, wherein each network node of the plurality of network nodes is associated with a level of hierarchy of distinct levels of hierarchy in the hierarchical communication network; and performing, by a global master node of the plurality of network nodes, a continuous collection and analysis of network-wide telemetry data across the distinct levels of hierarchy to implement a dynamic reassignment of hierarchical roles of specific network nodes of the plurality of network nodes, wherein the dynamic reassignment is based on at least one of:

changing positions of the specific network nodes, connectivity quality of the specific network nodes, or operational characteristics of the specific network nodes, the specific network nodes include a first network node and a second network node, the first network node is a slave node of the plurality of network nodes, the second network node is a local master node of the plurality of network nodes, and the operations further include:

receiving, by the first network node, upgraded parameters to transition to a local master node of the plurality of network nodes; and receiving, by the second network node, instructions to transition to a slave node of the plurality of network nodes, wherein the upgraded parameters include beam steering settings and routing tables.

15. The computer program product according to claim 14, wherein the plurality of network nodes further comprises:

a plurality of slave nodes, at a first level of hierarchy of the distinct levels of hierarchy, configured to establish communication with a plurality of local master nodes and a plurality of end-user devices;

the plurality of local master nodes, at a second level of hierarchy of the distinct levels of hierarchy, configured to establish communication with a plurality of regional master nodes;

the plurality of regional master nodes, at a third level of hierarchy of the distinct levels of hierarchy, configured to establish communication with the global master node; and the global master node at a fourth level of hierarchy of the distinct levels of hierarchy.

16. The computer program product according to claim 14, wherein the dynamic reassignment includes at least one of a promotion or a demotion of the specific network nodes within the distinct levels of hierarchy.

17. The computer program product according to claim 14, wherein the first network node shows an improved signal quality, and the second network node experiences degraded signal connectivity.

\* \* \* \* \*